United States Patent
Chandrasekaran et al.

(10) Patent No.: US 8,588,474 B2
(45) Date of Patent: Nov. 19, 2013

(54) MOTION DETECTION IN VIDEO WITH LARGE AREAS OF DETAIL

(75) Inventors: Ramesh M Chandrasekaran, Plano, TX (US); Fan Zhai, Richardson, TX (US); Weider Peter Chang, Colleyville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 128 days.

(21) Appl. No.: 13/180,500

(22) Filed: Jul. 11, 2011

(65) Prior Publication Data

US 2012/0008834 A1  Jan. 12, 2012

Related U.S. Application Data

(60) Provisional application No. 61/363,516, filed on Jul. 12, 2010.

(51) Int. Cl.
*G06K 9/00* (2006.01)

(52) U.S. Cl.
USPC .......................................... 382/107

(58) Field of Classification Search
None
See application file for complete search history.

(56) References Cited

U.S. PATENT DOCUMENTS

| | | | |
|---|---|---|---|
| 7,952,646 B2 | 5/2011 | Chiu | |
| 2006/0262225 A1 | 11/2006 | Chang et al. | |
| 2006/0268178 A1 | 11/2006 | Chang et al. | |
| 2006/0268179 A1* | 11/2006 | Renner et al. | 348/666 |
| 2007/0076128 A1 | 4/2007 | Chandrasekaran et al. | |
| 2008/0062307 A1 | 3/2008 | Zhai et al. | |
| 2008/0062309 A1* | 3/2008 | Zhai et al. | 348/452 |
| 2009/0184894 A1* | 7/2009 | Sato et al. | 345/60 |
| 2009/0268088 A1 | 10/2009 | Zhou | |
| 2010/0002953 A1* | 1/2010 | Kirenko et al. | 382/268 |
| 2010/0135592 A1* | 6/2010 | Zhang et al. | 382/261 |

OTHER PUBLICATIONS

Gwo Giun Lee, et al., "A Motion-Adaptive Deinterlacer via Hybrid Motion Detection and Edge-Pattern Recognition", Hindawi Publishing Corporation, EURASIP Journal on Image and Video Processing, vol. 2008, Article ID 741290, Feb. 2008, pp. 1-10.
"TMS320DM816x DaVinci Digital Media Processors", SPRS614, Texas Instruments Incorporated, Mar. 2011, pp. 1-312.

* cited by examiner

*Primary Examiner* — Stephen R Koziol
*Assistant Examiner* — Delomia Gilliard
(74) *Attorney, Agent, or Firm* — Mirna Abyad; W. James Brady; Frederick J. Telecky, Jr.

(57) ABSTRACT

A method for motion detection is provided that includes determining a first motion measure for a pixel based on differences between first neighboring pixels of the pixel, determining a detail measure for the pixel, wherein the detail measure is indicative of an amount of detail in second neighboring pixels of the pixel, adapting a first coring threshold and a first gain of a first transfer function based on the detail measure, and using the adapted first transfer function to map the first motion measure to a first motion parameter.

11 Claims, 11 Drawing Sheets

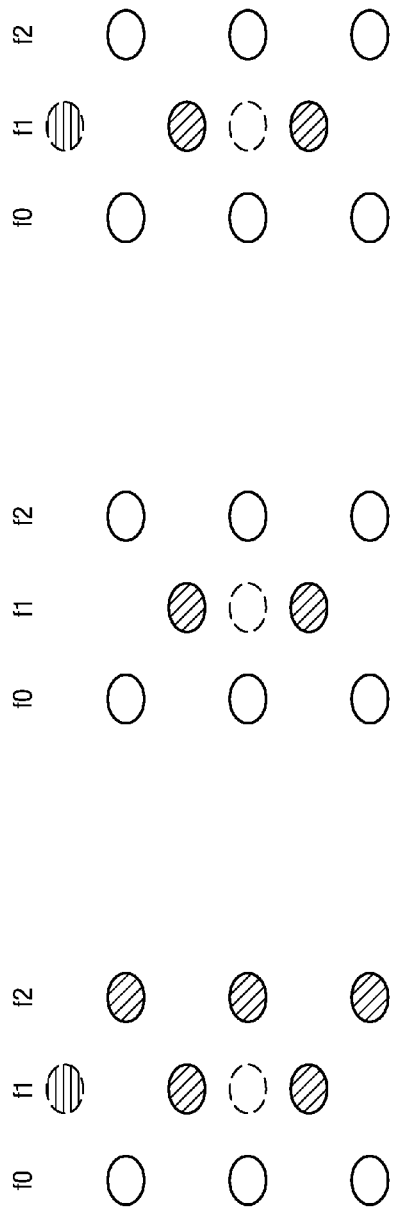
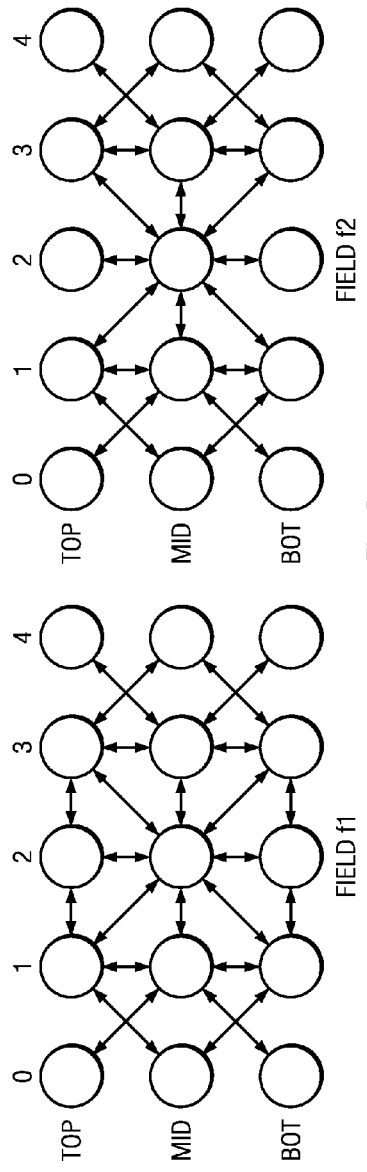
FIG. 7A  FIG. 7B  FIG. 7C
FIG. 8

MOTION DETECTION IN VIDEO WITH LARGE AREAS OF DETAIL

CROSS-REFERENCE TO RELATED APPLICATIONS

This application claims benefit of U.S. Provisional Patent Application Ser. No. 61/363,516, filed Jul. 12, 2010, which is incorporated by reference herein in its entirety.

BACKGROUND OF THE INVENTION

1. Field of the Invention

Embodiments of the present invention generally relate to a method and apparatus for motion detection in video with large areas of detail.

2. Description of the Related Art

Various video processing operations such as noise reduction, de-interlacing (interlaced to progressive conversion), and luma-chroma separation of composite video, may rely on the accurate detection of motion in the video signal. In general, such operations adapt the processing performed based on motion detected in the video signal such that temporal processing, also referred to as three dimensional (3D) or inter-frame processing, is favored in areas of a picture where there is no motion and spatial processing, also referred to as 2D processing or intra-frame processing, is favored in areas of a picture where motion is present. Examples of such operations are described in more detail in United States Patent Publication No. 2008/0062309, entitled "Motion Detection for Interlaced Video", filed on Sep. 7, 2007, United States Patent Publication No. 2006/0238179, entitled "Motion Detection for a Video Display System", filed on May 24, 2005, and United States Patent Publication No. 2006/0268178, entitled "Systems and Methods for Separating Luma and Chroma Information in a Composite Video Signal", filed on May 24, 2005. U.S. Patent Publication No. 2008/0062309 is incorporated by reference herein in its entirety.

These motion-adaptive operations rely on motion detection to measure the amount of motion at each pixel in a picture and to provide a motion parameter for each pixel that is indicative of the amount of motion detected at that pixel. Pixel differences in adjacent fields or frames are used to derive a motion measure for a given pixel. The motion measure is then mapped to a motion parameter representative of the amount of motion indicated by the motion measure. The mapping is accomplished by applying a transfer function, also referred to as a mapping function, that smoothes the transition between temporal and spatial processing. In general, the output of the transfer function, i.e., a motion parameter, is limited to a desired range, with the lower end of the range representing little or no motion and the other end representing a high degree of motion.

Based on these motion parameters, the processing performed by the motion-adaptive operation fades between temporal processing and spatial processing. Thus, if the motion detection is not accurate, temporal processing may be applied in areas of motion or spatial processing may be applied in static areas, resulting in degradation of picture quality.

SUMMARY

Embodiments of the present invention relate to a method for motion detection that includes determining a first motion measure for a pixel based on differences between first neighboring pixels of the pixel, determining a detail measure for the pixel, wherein the detail measure is indicative of an amount of detail in second neighboring pixels of the pixel, adapting a first coring threshold and a first gain of a first transfer function based on the detail measure, and using the adapted first transfer function to map the first motion measure to a first motion parameter.

BRIEF DESCRIPTION OF THE DRAWINGS

Particular embodiments in accordance with the invention will now be described, by way of example only, and with reference to the accompanying drawings:

FIGS. 7A-7C illustrate pixels used in detail determination calculations in the motion detection module of FIGS. 2-5;

FIG. 8 illustrates pixels used in spatial activity determination calculations;

DETAILED DESCRIPTION OF EMBODIMENTS OF THE INVENTION

Figure 1:
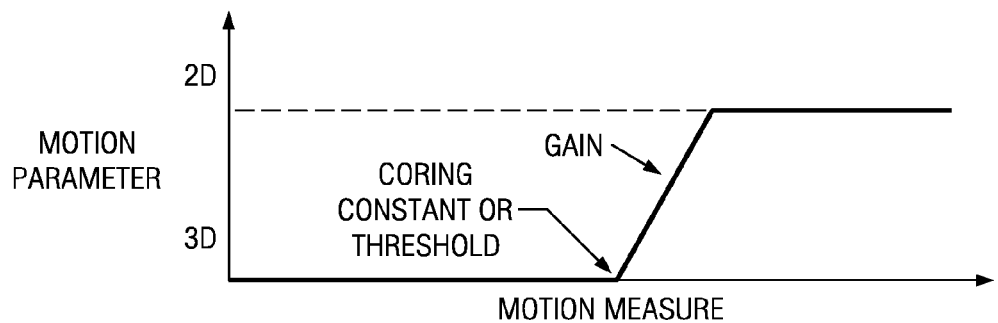
FIG. 1 shows a transfer function with a fixed coring threshold and gain.

Specific embodiments of the invention will now be described in detail with reference to the accompanying figures. Like elements in the various figures are denoted by like reference numerals for consistency.

As was previously mentioned, some prior art motion detection techniques use pixel differences in adjacent fields or frames to determine whether or not motion is present. In general, a motion measure derived from the pixel difference(s) is mapped to a motion parameter representative of the amount of motion indicated by the motion measure. The mapping is accomplished by applying a transfer function that smoothes the transition between temporal and spatial processing. In general, the output of the transfer function is limited to a desired range, with the lower end of the range representing little or no motion and the other end representing a high degree of motion. Further, a fixed coring constant or threshold is used to specify the minimum motion measure value at which the motion parameter value will be increased above the low end of the range and a fixed gain specifies how much to "gain up" a motion measure value to determine the corresponding motion parameter. The threshold and the gain are described as being fixed because while their values may be user-programmable, the values are not changed during operation.

The effect of the transfer function is as follows. If a motion measure value is large, the motion parameter value saturates to the upper limit indicating spatial processing. If the motion measure value is smaller than the threshold, the motion parameter value remains at the lower limit indicating temporal processing. If the motion measure value exceeds the threshold, the motion parameter value is increased linearly with the motion measure value by applying the gain to the motion measure value.

An example transfer function is shown in FIG. 1. The transfer function is represented as a line graph mapped on a horizontal axis that represents the value of a motion measure, and a vertical axis that represents the value of the motion parameter. The x-intercept of the transfer function is a coring constant or threshold that sets the threshold motion measure value for beginning the transition from temporal processing to spatial processing. Note that there will be no gain in the motion parameter until a threshold motion measure value is reached. The motion parameter then increases linearly with the motion measure value. Once the motion parameter reaches a maximum value, the transfer function reaches a saturation phase in which the motion parameter is retained at the maximum value.

The above motion detection technique has been shown to be robust and to provide good results for most video data. However, an appreciable percentage of consumer video includes scenes with large areas of detail, i.e., areas in which there is considerable change in the luma or chroma content between neighboring pixels in a given frame or field. Such areas may also be referred to as areas of high spatial frequency. For example, a scene could include leaves on a tree or a field of flowers. If these detail areas are shifted between frames (or fields) even to a small extent, e.g., a light breeze moves the leaves or the flowers, the pixel differences between frames or fields will be large due to the spatial frequency in the frames. The large pixel differences will cause spatial processing to be favored. However, applying spatial processing to such an area results in degraded picture quality, e.g., flicker. Counter-intuitively, temporal processing in such an area produces a much better picture even in the presence of some motion. The temporal processing blurs or smoothes the video data, which is more acceptable to the human eye than flicker.

Also, an appreciable percentage of consumer video includes scenes with very fast motion or rapid oscillatory motion. For example, a scene could include a ball that is being tossed back and forth very quickly or a multi-colored object spinning rapidly. In such scenes, the pixel differences between adjacent frames or fields could be 0 or very small, even though motion is present in the scene. The low pixel differences will cause temporal processing to be favored. However, applying temporal processing results in degraded picture quality due to combing or feathering artifacts.

Embodiments of the invention provide for motion detection that better handles large areas of detail and areas of very fast or oscillatory motion. More specifically, motion detection is provided that produces motion parameters that favor temporal processing in detail areas with low motion and favor spatial processing in areas with motion so fast that little or no pixel to pixel difference is detected. This is accomplished, at least in part, by adapting the threshold and gain of the transfer function for a pixel based on conditions detected in the pixel neighborhood, e.g., the amount of detail (strength of the spatial frequency), the speed of change of pixel values across adjacent frames or fields, etc. For example, for motion detection in de-interlacing, the motion detection may estimate the spatial frequency in a pixel neighborhood and increase the threshold based on the strength of the spatial frequency. This will increase the probability that the resulting motion parameter will favor temporal processing.

The particular conditions that control the adaptation and the pixels included in the pixel neighborhood for evaluating the conditions may differ according to the particular video processing operation. For example, motion detection for a de-interlacing operation may evaluate different pixel neighborhood conditions for controlling the adaptation than motion detection for a noise reduction operation.

In some embodiments, in addition to the adaptive control of the transfer function, techniques for determining the amount of motion are used that generate pixel differences based on a pixel neighborhood of the pixel being processed. These techniques help identify if the motion is such that it is acceptable to apply temporal processing. For example, these techniques may result in a small motion measure despite the presence of large differences between the corresponding pixels of adjacent frames. This motion measure when applied to the transfer function, also increases the probability that the resulting motion parameter will favor temporal processing.

The descriptions of the illustrative embodiments and examples herein assume that the motion detection is performed in the context of de-interlacing video. One of ordinary skill in the art, having benefit of this disclosure, will understand other embodiments of the motion detection techniques for other video processing operations such as noise reduction, luma-chroma separation, etc. without need for additional explanation.

In interlaced video, each image frame includes two fields, each of which contains pixels of either the even numbered (top field) or the odd numbered (bottom field) lines of the image. The function of de-interlacing is to convert the interlaced frames into progressive frames which represent the same image as an input field with the missing lines filled in. That is, each field in the interlaced video is converted to a frame of progressive video that contains the pixels of the lines in the input field and estimates for the pixels in the missing lines.

De-interlacing based on motion detection may estimate the value of a pixel using both spatial and temporal interpolation. In spatial interpolation, a pixel value is interpolated from spatially corresponding pixels above and below the pixel in the same frame, i.e., from the pixels values in the field being de-interlaced. For example, if the missing line in a field f1 is line 1, the corresponding pixels in line 0 and/or line 2 of f1 are used to estimate values for pixels in line 1. In temporal interpolation, a pixel value is interpolated from temporally corresponding pixels in the previous and subsequent fields. For example, if the missing line in a field f1 is line 1, the corresponding pixels in line 1 of the previous field f0 and line 1 of the subsequent field f2 are used to estimate values for pixels in line 1 of f1.

The outputs of the spatial and temporal interpolation are blended based on the motion parameter for the pixel provided by motion detection to product the estimated pixel value. Note that if the motion parameter is 0, the pixel value will be the output of the temporal interpolation and if the motion parameter is at the maximum, the pixel value will be the output of the spatial interpolation. If the motion parameter is between the two, the pixel value will be a combination of the temporal and spatial interpolation outputs in which the contribution of each output to the combination is controlled by the motion parameter.

Figure 2:
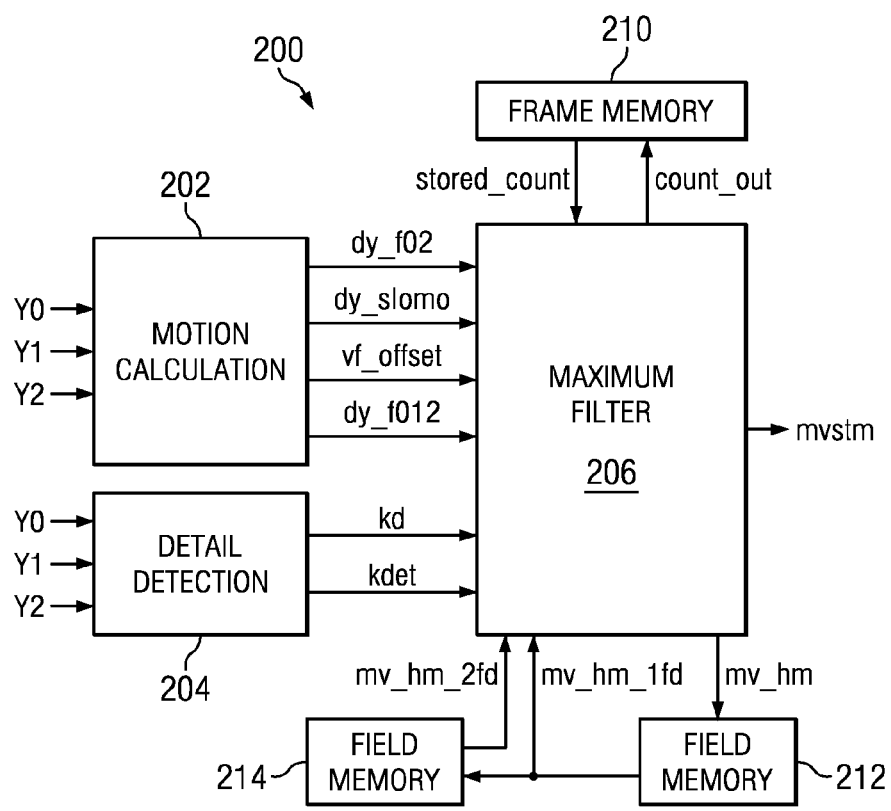
FIGS. 2-5 show block diagrams of a motion detection module.

FIGS. 2-5 show block diagrams of a motion detection module 200 configured for use in a de-interlacing system at different levels of detail. Referring first to FIG. 2, in general, the motion detection module 200 receives as inputs the luma components of pixels from three fields, the field that is being de-interlaced, referred to as f1 or Y1 herein, the field preceding the field being de-interlaced in the video sequence, referred to as f0 or Y0 herein, and the field following the field being de-interlaced in the video sequence, referred to as f2 or Y2 herein. The output of the motion detection module 200 is a motion parameter (mvstm) for each pixel in the missing lines of f1, i.e., the lines that are to be interpolated by the de-interlacing system.

The motion calculation component 202 determines four pixel difference measures for an interpolated pixel in f1 and provides the pixel difference measures to the maximum filter component 206. The four motion measures include a frame difference measure (dy_f02), a slow motion frame difference measure (dy_slomo), a vertical frequency measure (vf_offset), and a field difference measure (dy_f012).

Figure 3:
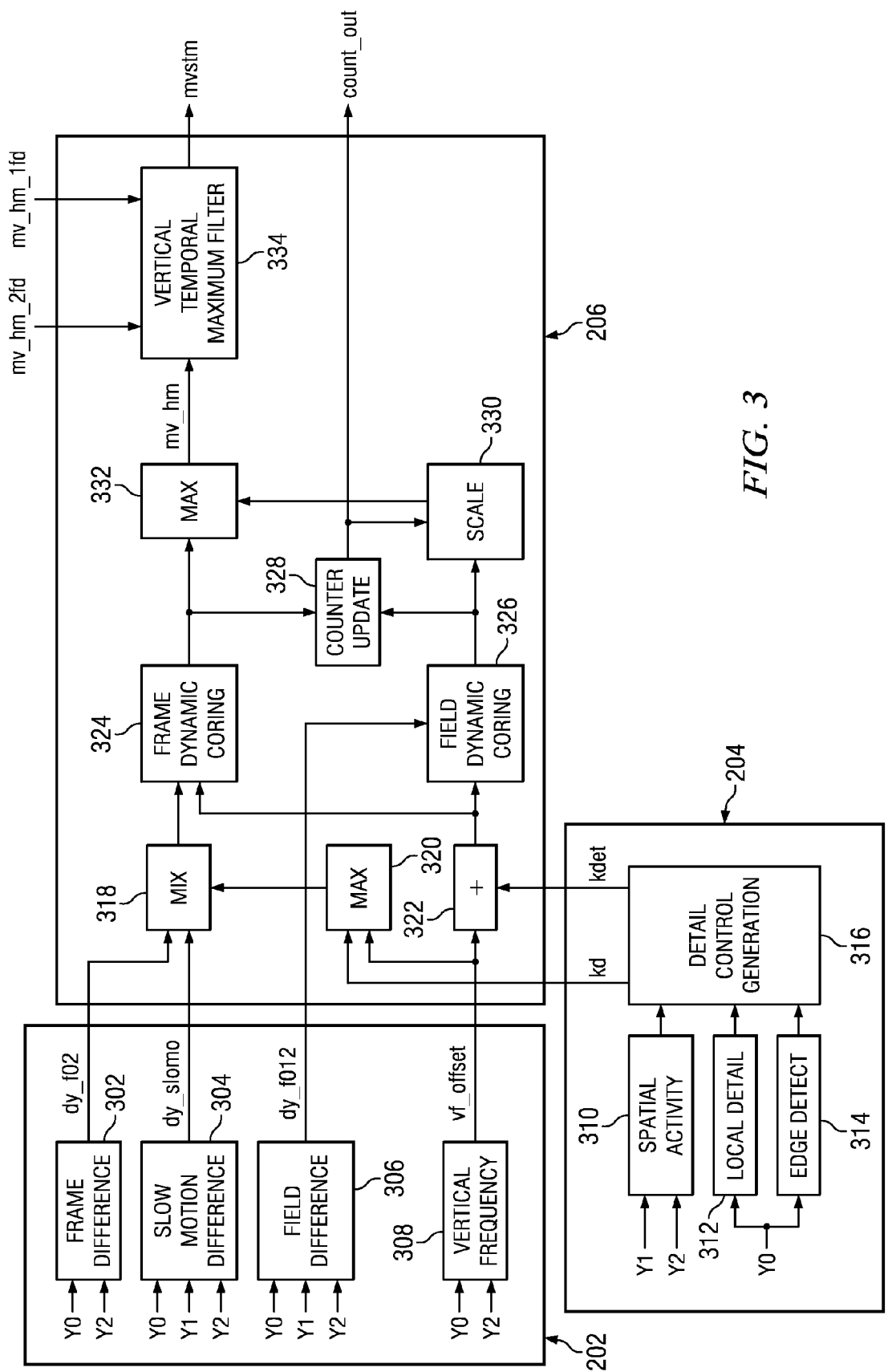

Referring now to FIG. 3, the motion calculation component 202 includes a frame difference component 302 that generates the frame difference measure (dy_f02), a slow motion difference component 304 that generates the slow motion frame difference measure (dy_slomo), a field difference component 306 that generates the field difference measure (dy_f012), and a vertical frequency component 308 that generates the vertical frequency measure (vf_offset). Each of these components generates the value of the respective measure using the luma components of pixels neighboring the interpolated pixel. In general, the neighboring pixels considered may be different for each component. For example, the frame difference component 302 and the vertical frequency component 306 use luma pixel values from f0 and f2 while the slow motion difference component 304 and the field difference component 306 use luma pixel values from f0, f1, and f2.

FIGS. 6A-6D respectively illustrate the pixel neighborhoods used by the frame difference component 302, the slow motion difference component 304, the field difference component 306, and the vertical frequency component 308. In these figures, each column represents a field and each circle represents one line of pixels in that field. In one embodiment, three neighboring fields are involved in the calculation, with the center field f1 referring to the field that is being interpolated. Thus three fields are shown in the figures. The dotted circle in the middle of the f1 column represents the pixel being interpolated and the other circles in each of columns labeled f0, f1, f2 represent neighboring pixels in the spatial and temporal domains. The red colored circles represent the pixels in the spatial and temporal domains that are actually used in the respective computations. The rows labeled top and bottom are the lines in f1 that are above and below the line being interpolated, respectively. The rows labeled mid are the lines in the previous field f0 and the subsequent field f2 that have the same spatial location as the line being interpolated in field f1. The lines labeled up are the lines above the lines labeled mid in the previous field f0 and the subsequent field f2. The lines labeled down are the lines below mid in the previous field f0 and the subsequent field f2.

Figure 4:
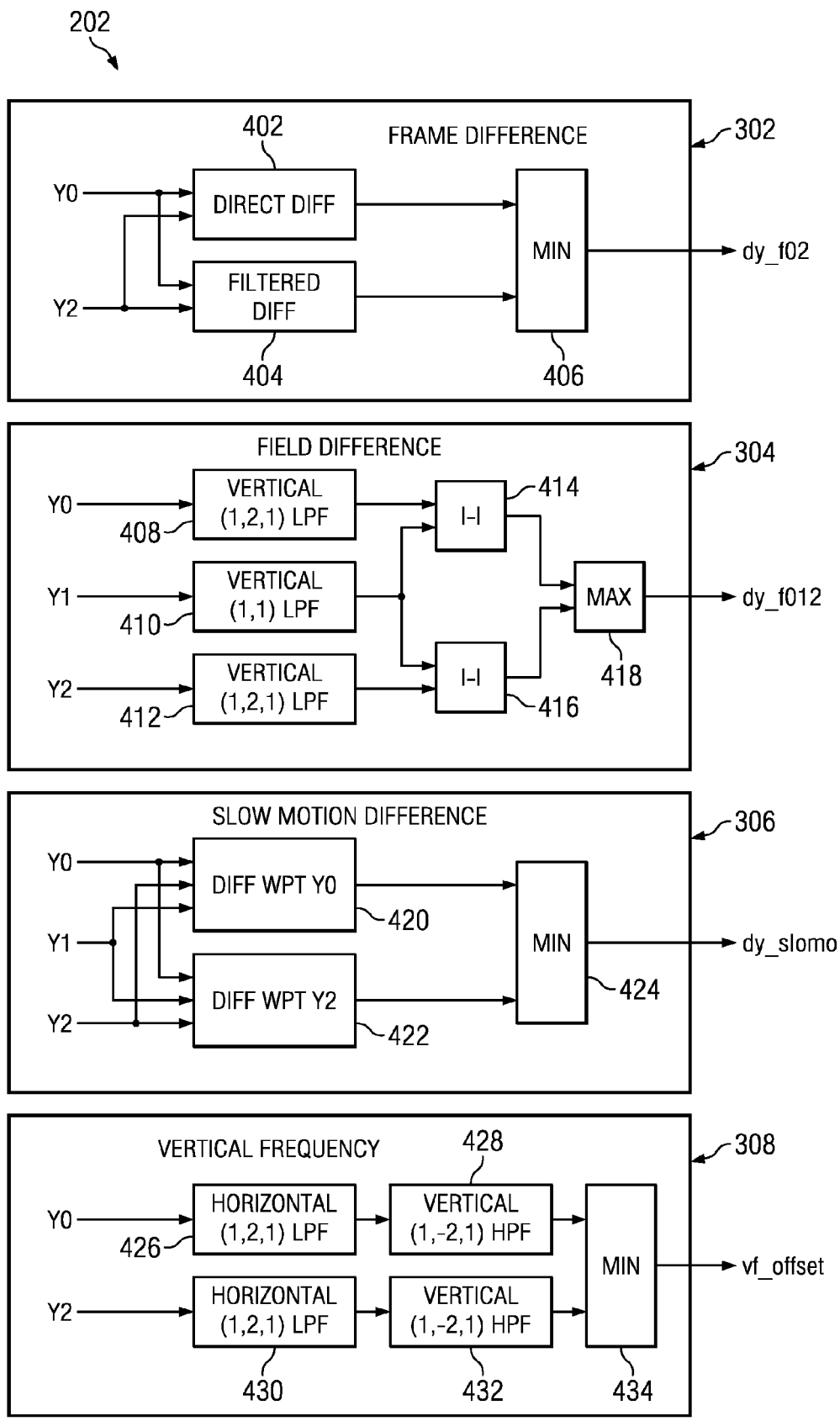
Figure 6A:
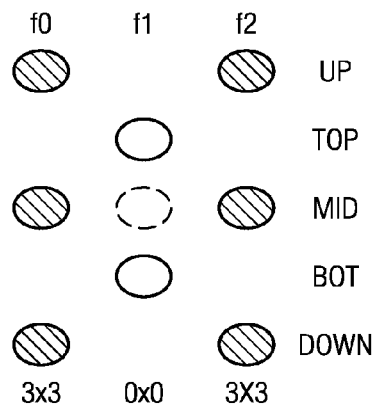
FIGS. 6A-6D illustrate pixels used in difference calculations in the motion detection module of FIGS. 2-5.

FIG. 4 shows the frame difference component 302, the field difference component 304, the slow motion difference component 306, and the vertical frequency component 308 at a further level of detail. The frame difference component 302 operates as follows. A direct difference component 402 determines the direct difference between the pixel corresponding to the interpolated pixel in f0 and the pixel corresponding to the interpolated pixel in f2, i.e., the difference between mid f0 and mid f2 (FIG. 6A).

A filtered difference component 404 determines a filtered difference between the neighboring pixels in f0 and the neighboring pixels in f2. This filtered difference will be smaller than the direct difference when detail is not present in the neighboring pixels. The filtered difference is determined as the difference between a filtered pixel value for f0 and a filtered pixel value for f2. The filtered pixel value for f0 is determined by applying a (1,2,1) low pass filter horizontally and vertically on the neighboring pixels in f0, i.e., up f0, mid f0, down f0 (FIG. 6A). The filtered pixel value for f2 is determined by applying a (1,2,1) low pass filter horizontally and vertically on the neighboring pixels in f2, i.e., up f2, mid f2, down f2 (FIG. 6A). The minimum 406 of the direct difference and the filtered difference is selected to be the field difference measure (dy_f02).

Table 6 (at the end of detailed description) shows example pseudo code for determining the direct difference and the filtered difference in one embodiment of the frame difference component 302. In this pseudo code, a (1,2,1) horizontal low pass filter is applied to each of up f0, mid f0, down f0, up f2, mid f2, and down f2 to determine an average value for each. In Table 6, <pos>_<field>[2] is one pixel delayed with respect to <pos>_<field>[1] which is one pixel delayed with respect to <pos>_<field>[0], where <pos> is up, mid, or down and <field> is f0 or f2. A (1,2,1) vertical low pass filter is then applied to the average horizontal values for f0 (upf0_avg, midf0_avg, downf0_avg) and the average horizontal values for f1 (upf2_avg, midf2_avg, downf2_avg). In Table 6, dy_f02_a is the direct field difference, dy_f02_filt is the filtered field difference, and dy_f02 is the frame difference measure.

Figure 6B:
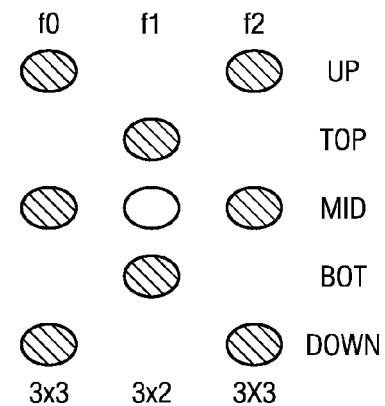
Figure 6C:
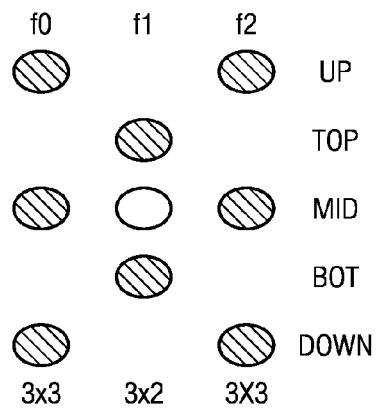
Figure 6D:
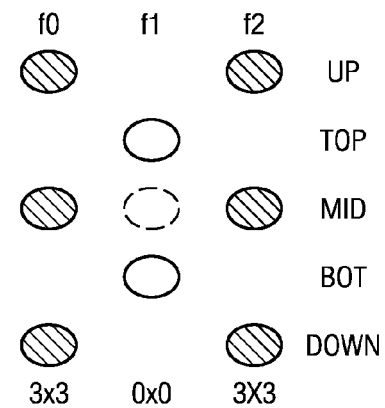

The field difference component 304 operates as follows. A vertical filter component 408 applies a (1,2,1) vertical low pass filter 304 to f0, i.e., up f0, mid f0, down f0 (FIG. 6B), a vertical filter component 410 applies a vertical (1,1) low pass filter 410 to f1, i.e., top f1, bot f1 (FIG. 6B), and a vertical filter component 412 applies a (1,2,1) vertical low pass filter 412 to f2, i.e., up f2, mid f2, down f2 (FIG. 6B). The maximum 418 of the absolute difference 414 between the filtered pixel values of f0 and f1 and the absolute difference 416 between the filtered pixel values of f2 and f1 is selected to be the field difference measure (dy_f012). Table 6 shows example pseudo code for determining the field difference measure in one embodiment of the field difference component 304.

The slow motion difference component 306 operates as follows. The Y0 difference computation component 420 determines the difference with respect to the center pixel of f0, i.e., mid f0 (FIG. 6C) and each neighboring pixel in f1 and each neighboring pixel in f2 and selects the minimum of these differences. A total of fourteen differences is computed. The Y2 difference computation component 422 determines the difference with respect to the center pixel of f2, i.e., mid f2 (FIG. 6C) and each neighboring pixel in f1 and each neighboring pixel in f0 and selects the minimum of these differences. A total of fourteen differences is computed. The minimum 424 of the differences from the Y0 difference computation component 420 and the Y2 difference computation component 422 is selected as the slow motion frame difference measure (dy_slomo). Table 6 shows example pseudo code for determining the slow motion frame difference measure in one embodiment of the slow motion difference component 306.

The vertical frequency component 308 operates as follows. A horizontal filter component 426 applies a horizontal (1,2,1) low pass filter to each of up f0, mid f0, down f0 (FIG. 6D) to determine an average for each. A vertical filter component 428 then applies a vertical (1, −2, 1) high pass filter to the average horizontal values to determine an average pixel value for f0. A horizontal filter component 430 applies a horizontal (1,2,1) low pass filter to each of up f2, mid f2, down f2 (FIG. 6D) to determine an average horizontal value for each. A vertical filter component 432 then applies a vertical (1, −2, 1)

high pass filter to the average horizontal values to determine an average pixel value for f2. The minimum 434 of the f0 average pixel value and the f2 average pixel value is selected, cored, and gained to generate the vertical frequency measure (vf_offset). Table 6 shows example pseudo code for determining the vertical frequency measure in one embodiment of the vertical frequency component 308.

Referring back to FIG. 2, the detail detection component 204 analyzes pixels neighboring the interpolated pixel in f1 to determine the amount of detail present and generates two control values, a motion mix control (kd) and a coring threshold control (kdet) representative of the amount of detail in pixels neighboring the interpolated pixel in f1 and f2. The values of the motion mix control and the coring threshold control are determined such that the values increase according to the amount of detail detected.

Referring now to FIG. 3, the detail detection component 204 includes a spatial activity component 310 that determines an estimate of the detail in the vicinity of the interpolated pixels in f1 and f2, i.e., an activity count, a local detail component 312 that determines an estimate of the detail in the immediately neighboring pixels of the interpolated pixel in f1, and a edge detection component 314 that estimates the strength and complexity of edges in f1. The detail detection component 204 also includes a detail control generation component 316 that uses the detail estimates and the edge strength and complexity estimates to generate the motion mix control (kd) and the coring threshold control (kdet).

FIGS. 7A-7C illustrate the pixel neighborhoods used by the spatial activity component 310, the local detail component 312, and the edge detection component 314. In these figures, each column represents a field and each circle represents a line of pixels in that field. In one embodiment, three neighboring fields are involved in the calculation, with the center field f1 referring to the field that is being interpolated. Thus three fields are shown in the figures. The dotted circle in the middle of the f1 column represents the pixel being interpolated and the other circles in each of columns labeled f0, f1, f2 represent neighboring pixels in the spatial and temporal domains. The red colored circles represent the pixels in the spatial and temporal domains that are actually used in the respective computations. The rows labeled top and bottom are the lines in f1 that are above and below the line being interpolated, respectively. The rows labeled mid are the lines in the previous field f0 and the subsequent field f2 that have the same spatial location as the line being interpolated in field f1. The lines labeled up are the lines on top of the lines labeled mid in the previous field f0 and the subsequent field f2. The lines labeled down are the lines below mid in the previous field f0 and the subsequent field f2. The shaded circles represent the pixels that are used in the respective computations depending upon whether the field f1 is the top field or the bottom field in an interlaced frame. If f1 is the top field, the pixels corresponding to the top shaded circle are used. If f1 is the bottom field, the pixels corresponding to the bottom shaded circle are used.

Figure 5:
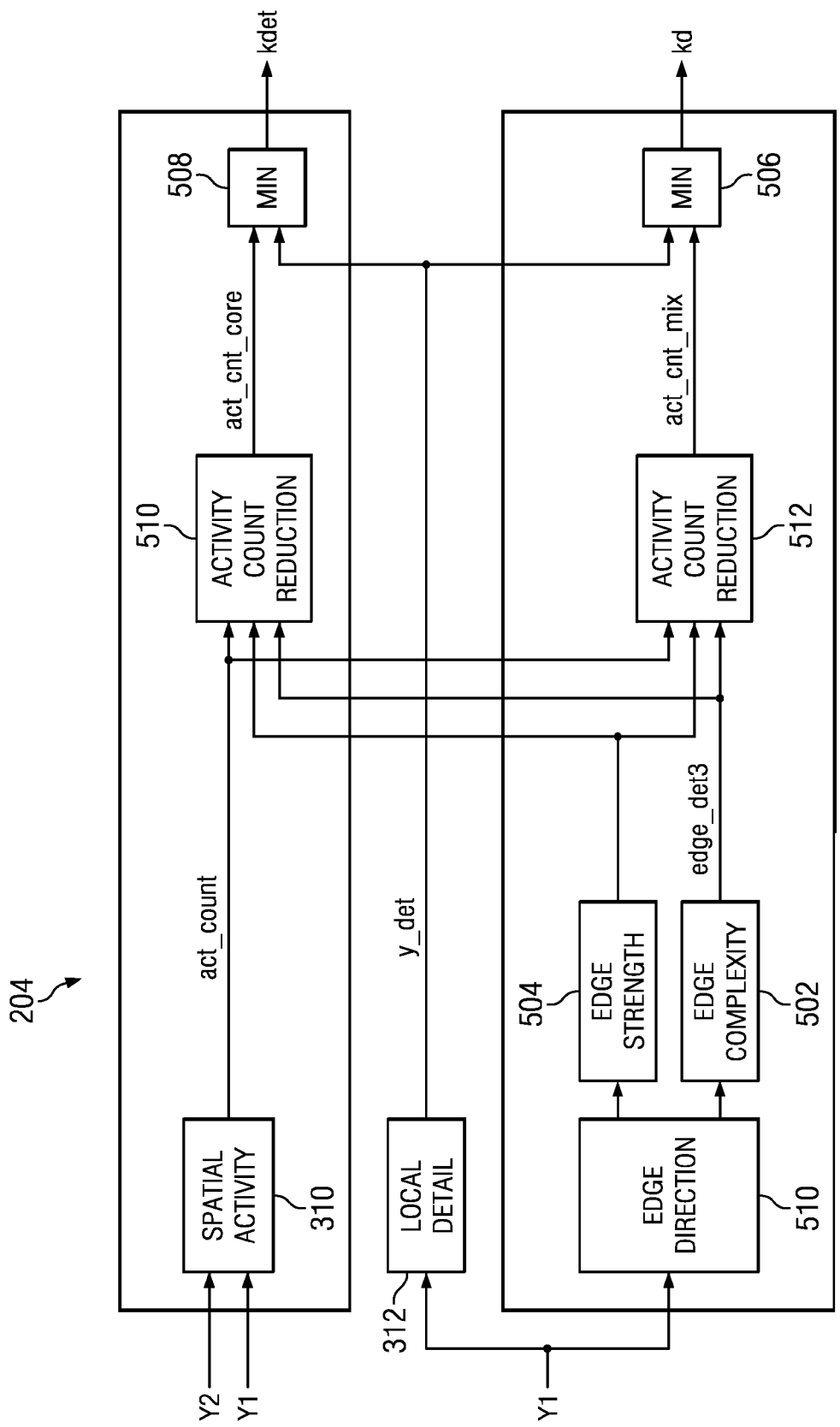

FIG. 5 shows the detail detection component 204 in greater detail. In this figure, the edge direction component 510, the edge strength component 504, and the edge complexity component 502 are components of the edge detection component 314 (FIG. 3). The activity count reduction components 510, 512 and the min components 506, 508 are components of the detail control generation component 316 (FIG. 3). The detail detection component 204 operates as follows.

The spatial activity component 310 determines an activity count (act_count) indicative of the amount of detail present in a pixel neighborhood (FIG. 7A) of the interpolated pixel. The activity count enumerates the number of pairs of pixels in f1 and f2 whose differences are greater than a predetermined activity threshold. The higher the resulting count, the more activity there is in the vicinity of the interpolated pixel. FIG. 8 illustrates the pixel difference computations for each of the fields. A total of 24 pixel differences are computed for f1 and 20 pixel differences are computed for f2. Each of the pixel differences is compared to the activity threshold and the activity count is incremented for each pixel difference meeting or exceeding the threshold. For f1, the location of the three lines with respect to the interpolated pixel, i.e., the locations of top, mid, bot, changes depending on whether f1 is the top field or the bottom field of the interlaced frame. Note that the area tested for detail is the equivalent of five pixels by six lines in the resulting progressive frame.

Table 7 (at the end of the detailed description) shows example pseudo code for determining the activity count in one embodiment of the spatial activity component 310. In the pseudo code, mdt_act_th is the activity threshold. The activity threshold may be predetermined based on simulation results and/or may be user programmable.

Figure 10:
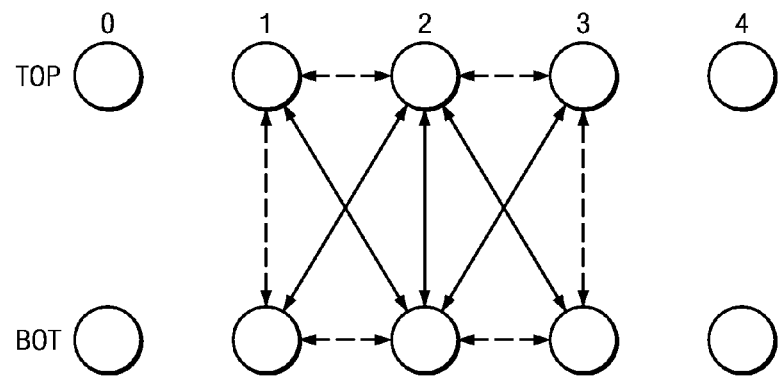
FIG. 10 illustrates pixels used in local detail determination calculations.

The local detail component 312 estimates the detail in the immediate temporal and spatial pixel neighborhood (FIG. 7B) of the interpolated pixel in f1. More specifically, the local detail component 312 calculates a local detail measure (y_det) indicative of the amount of detail in the pixel neighborhood. The local detail measure is computed as a weighted average of pixel differences in the neighboring pixels where the sum of the differences between the temporally center pixel in each row and the pixels in the other row is weighted more heavily (2×) than the differences between the border pixels of the pixel neighborhood. FIG. 10 illustrates the pixel difference computations. In this figure, the dotted arrows represent the border pixel difference computations and the solid arrows represent the computations between the temporally center pixel in each row and the pixels in the other row.

Table 9 (at the end of detailed description) shows example pseudo code for determining the activity count in one embodiment of the local detail component 312. In the pseudo code, y_det is the final local detail measure and y_detail is the weighted averaged of the pixel differences. The value of y_detail is cored (mdt_y_det_th) and gained (mdt_y_det_ga) to compute y_det. The coring and gain values may be predetermined based on simulation results and/or may be user programmable.

Figure 9:
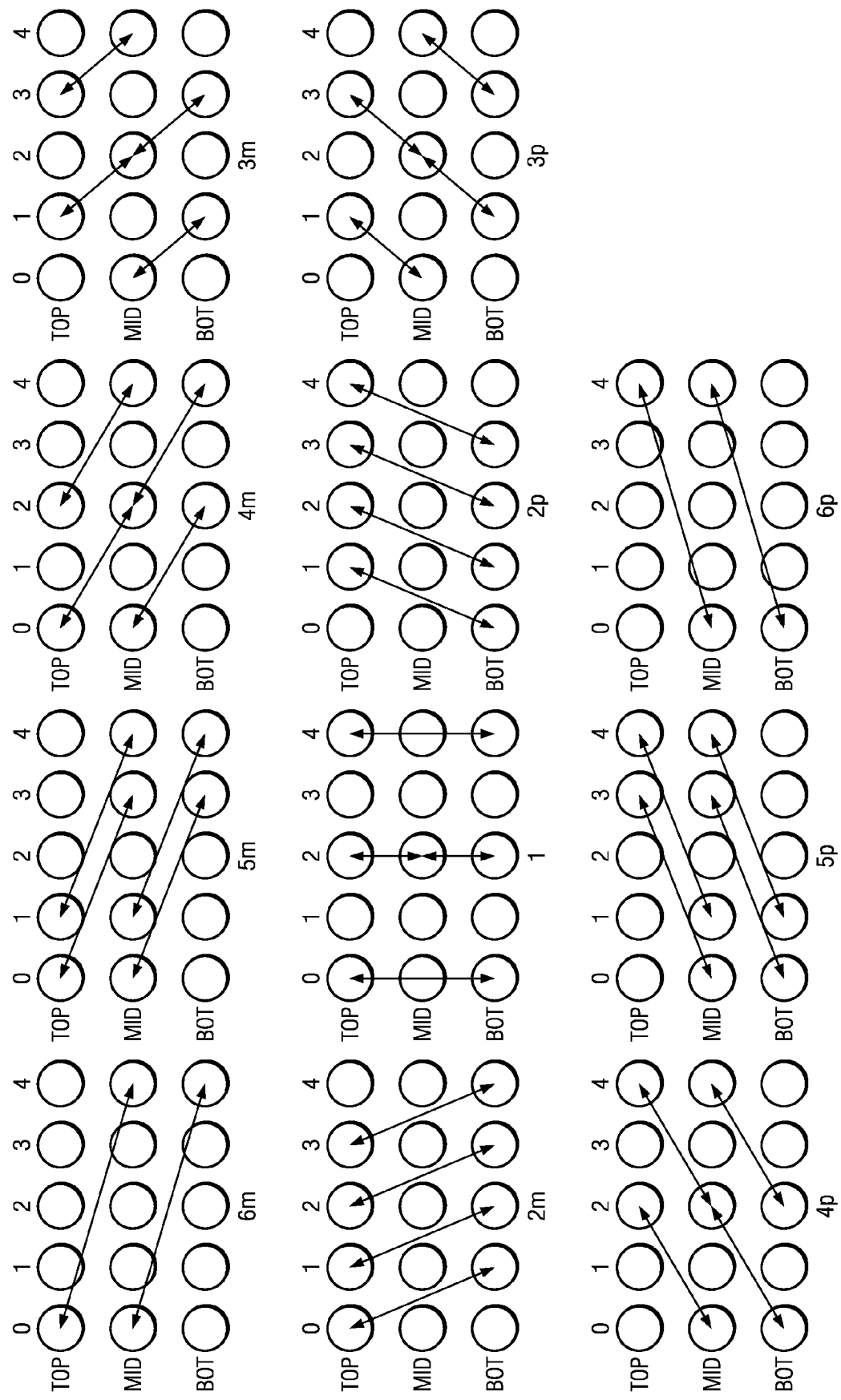
FIG. 9 illustrates pixels used in edge detection calculations.

The edge direction component 510 computes directional differences based on pixel differences in a temporal and spatial pixel neighborhood (FIG. 7c) of the interpolated pixel in f1. The location of the three lines with respect to the interpolated pixel, i.e., the locations of top, mid, bot, changes depending on whether f1 is the top field or the bottom field of the interlaced frame. More specifically, the edge direction component 510 computes directional differences in eleven directions with respect to the interpolated pixel. Each directional distance is the average of pixel differences in the pixel neighborhood corresponding to the direction. FIG. 9 illustrates the directional difference computations. In this figure, the arrows indicate the pixels considered in each direction. The edge direction component 510 also determines the maximum and the minimum of the directional differences, and provides the maximum directional difference and the minimum direction difference to the edge strength component 504. The edge direction component 510 also provides all of the directional differences to the edge complexity component 504.

Table 8 (at the end of detailed description) shows example pseudo code for determining the directional differences in one embodiment of the edge direction component 510. In the pseudo code, dir_a is an array storing the result of each directional computation, min_dir is the minimum of the directional computations, and max_dir is the maximum of the directional computations.

The edge strength component 504 determines two measures of the edge strength, i.e., edge magnitude, in the pixel neighborhood based on the difference between the minimum and maximum directional differences determined by the edge direction component 510. More specifically, the edge strength component 504 computes the difference between the minimum and maximum directional differences, and applies a predetermined edge threshold to the difference to compute an edge strength measure for determining the motion mixture control (kd). The predetermined edge threshold sets a lower limit on the determination of whether edges are present or not in the pixel neighborhood. The lower the edge threshold, the more edges will be detected, and the result will be increasingly susceptible to noise and detecting edges of irrelevant features. Conversely, a high edge threshold may miss subtle edges, or result in fragmented edges. The edge strength component 504 also computes an edge strength measure for determining the coring threshold control (kdet) based on the edge strength measure. Further, the edge strength component 504 provides the edge strength measure for determining the coring threshold control to the activity count reduction component 510 and the edge strength measure for determining the motion mix control to the activity count reduction component 512.

Table 8 shows example pseudo code for determining the edge strength measures in one embodiment of the edge strength component 504. In the pseudo code, edge_mag1 is the difference between the maximum and minimum directional differences, edg_mag is the edge strength measure for determining the motion mix control and edg_mag_varth is the edge strength measure for determining the coring threshold control. The value of edge_mag1 is cored (mdt_edge_th) and scaled (mdt_edg_rtshift) to compute edg_mag. The value of edge_mag is scaled (mdt_edg_rtshift_varth) to compute edg_mag_varth. The coring and scaling values may be predetermined based on simulation results and/or may be user programmable.

The edge complexity component 502 determines a measure of the edge complexity (edg_det3) in the pixel neighborhood based on the directional differences determined by the edge direction component 510. More specifically, to determine the edge complexity measure, the edge complexity component 502 first applies a (1, 2, 1) low pass filter to each directional difference. The edge complexity component 502 then processes filtered directional differences processed in direction order from left to right (see FIG. 9), computing the difference between each filtered directional difference and the subsequent filtered directional difference, and summing the distinct differences. The result is the edge complexity measure. If the edge complexity measure is small, the edge is very clear; if it is large, the edge is complex. The edge complexity component 502 provides the edge complexity measure to the activity count reduction components 510, 512.

Table 8 shows example pseudo code for determining the edge complexity measure in one embodiment of the edge complexity component 502. In this pseudo code, the array dir_a stores the directional differences in direction order, the array dir stores the filtered directional differences in direction order, and edge_det3 is the edge complexity measure.

The activity count reduction components 510, 512 decreases the activity count (act_count) based on the edge complexity and the edge strength in the pixel neighborhood as indicated by the edge complexity measure and the respective edge strength measures. More specifically, the activity count reduction components 510, 512 reduce the activity count based on the respective edge strength measures when the edge complexity measure indicates the probability of a clear edge in the pixel neighborhood. The output of the activity reduction component 510 is an activity count (act_cnt_core) for determining the coring threshold control (kdet). The output of the activity reduction component 512 is an activity count (act_cnt_mix) for determining the motion mix control (kd). Table 8 shows example pseudo code for decreasing the activity count in one embodiment of the activity count reduction component 510. Table 9 shows example pseudo code for decreasing the activity count in one embodiment of the activity count reduction component 512. The threshold values mdt_act_det_th1, mdt_act_det_th2, mdt_act_det_th3 may be predetermined based on simulation results and/or may be user programmable.

The minimum component 508 chooses the minimum of the activity count (act_cnt_core) from the activity count reduction component 510 and the local detail measure (y_det) from the local detail component 312 as the coring threshold control (kdet). The minimum component 506 chooses the minimum of the activity count (act_cnt_mix) from the activity count reduction component 512 and the local detail measure (y_det) from the local detail component 312 as the motion mix control (kd). Table 9 shows example pseudo code for one embodiment of the minimum components 506, 508.

Referring back to FIG. 2, the maximum filter component 206 uses the various motion measures from the motion calculation component 202 and the two control values from the detail detection component 204 to generate the motion parameter (mvstm). Referring now to FIG. 3, the maximum filter component 206 operates as follows. The vertical frequency measure is added 322 to the coring threshold control and the resulting coring threshold control is provided to both the frame dynamic coring component 324 and the field dynamic coring component 326.

The frame difference measure and the slow motion frame difference measure are mixed 318 to generate a frame motion measure that is provided to the frame dynamic coring component 324. The mixing 318 is based on a motion mix control that is the maximum 320 of the vertical frequency measure and the motion mix control from the detail detection component 204. The mixing 318 is performed such that the larger the value of the motion mix control, the more the slow motion frame difference contributes to the frame motion measure and the less the frame difference measure contributes. Thus, the higher the amount of detail, the smaller the frame difference measure will be.

Table 1 shows example pseudo code for determining the coring threshold control, the motion mix control, and the frame motion measure in one embodiment of the maximum filter component 206. In this pseudo code, a (1,2,1) low pass filter is applied to each of the frame difference measure (dy_f02), the slow motion frame difference measure (dy_slomo), and the vertical frequency measure (vf_offset) and the filtered results are used in the adding 322 and mixing 318. In Table 1, <diff-name>_za[0] is 1 pixel delayed with respect to <diff-name>, <diff-name>_za[1] is <diff-name>, and <diff-name>_za[2] is 2 pixel delayed with respect to <diff-name>, where <diff-name> is dy_f02, dy_slomo, vf_offset, dy_f012. Also, kdet_vf is the coring threshold control after the adding 322, kd_vf is the motion mix control after the maximum 320, and dy_I is the frame motion measure.

TABLE 1

Controls and Frame Motion Measure

```
//Apply (121) low pass filter to dy_f02, dy_slomo, vf_offset, dy_f012
dy_f02_z1 = (dy_f02_za[0]+(dy_f02_za[1]<<1)+dy_f02_za[2])>>2;
dy_slomo_z1 =
(dy_slomo_za[0]+(dy_slomo_za[1]<<1)+dy_slomo_za[2])>>2;
vf_z1 = (vf_za[0]+(vf_za[1]<<1)+vf_za[2])>>2;
dy_f012_z1 =
(dy_f012_za[0]+(dy_f012_za[1]<<1)+dy_f012_za[2])>>2;
if (vf_z1 > 16) vf_sat = 16;
else vf_sat = vf_z1;
//Determine motion mix control
if (kd > vf_sat) kd_vf = kd;
else kd_vf = vf_sat;
//Determine coring threshold control
kdet_vf = kdet+vf_z1;
//Mix slow motion & frame differences
if (dy_slomo_z1 < dy_mf02_z1)
     dy_min_slomo_mf02 = dy_slomo_z1;
else
     dy_min_slomo_mf02 = dy_mf02_z1;
dy_l= ((DATA)kd_vf*dy_min_slomo_mf02 +
(DATA)(16-kd_vf)*dy_f02_z1) >> 3;
```

Referring back to the maximum filter component 206 in FIG. 3, the frame dynamic coring component 324 generates a frame motion parameter based on the frame motion measure and the coring threshold control. More specifically, the frame dynamic coring component 324 implements a dynamic transfer function for mapping frame motion measure values to frame motion parameter values. In this dynamic transfer function, the gain and the coring threshold of the transfer function may be dynamically changed based on the coring threshold control.

The field dynamic coring component 326 generates a field motion parameter based on the field difference measure and the coring threshold control. More specifically, the field dynamic coring component 326 implements a dynamic transfer function for mapping field difference measure values to field motion parameter values. In this dynamic transfer function, the gain and the coring threshold of the transfer function may be dynamically changed based on the coring threshold control.

Figure 11:
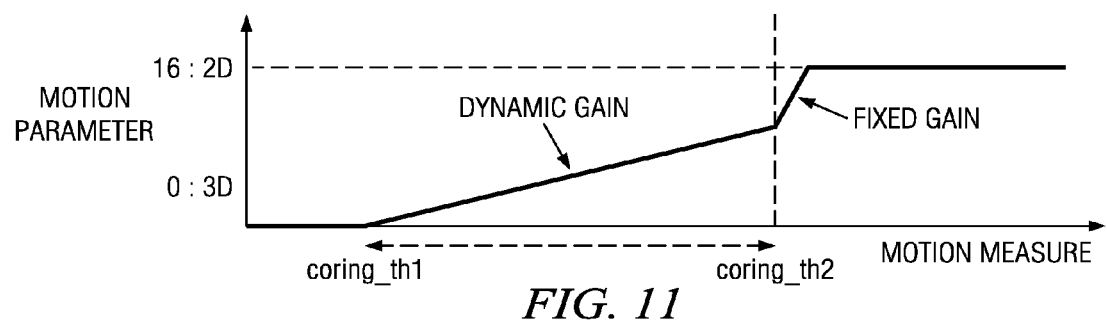
FIG. 11 illustrates a transfer function with a dynamically adjustable coring threshold and gain.

FIG. 11 shows a dynamic transfer function that implemented by the frame dynamic coring component 324 and the field dynamic coring component 326. The dynamic transfer function is represented as a line graph mapped on a horizontal axis that represents the value of a motion measure, and a vertical axis that represents the value of the motion parameter. The output of the transfer function is limited to a desired range (0-16), with the lower end of the range representing little or no motion and the other end representing a high degree of motion. The x-intercept of the transfer function is a dynamic coring threshold that that sets the lowest motion measure value for beginning the transition from temporal processing to spatial processing. Note that there will be no gain in the motion parameter until an input motion measure value exceeds this dynamic coring threshold.

The dynamic coring threshold for an input motion measure value is determined by increasing a fixed lowest coring threshold (coring_th1) based on the coring threshold control calculated for the input motion measure, e.g., the coring threshold control is added to the lowest coring threshold to determine the dynamic coring threshold. If the dynamic coring threshold is between the fixed lowest coring threshold and a fixed highest coring threshold (coring_th2), the gain used to determine the motion parameter is also dynamic and may be increased based on the coring threshold control.

More specifically, there is a fixed highest gain for the dynamic transfer function. If the dynamic coring threshold is between the two fixed coring thresholds, the gain used may be decreased as a function of the coring threshold control. For example, the gain may be scaled down in steps by comparing the coring threshold control to one or more gain stepping thresholds of increasing value. Each of the gain stepping thresholds may have an associated gain scaling factor such that the gain scaling factors decrease in value as the gain stepping thresholds increase in value. The fixed highest gain is then scaled by the scaling factor associated with the largest gain stepping threshold greater than or equal to the coring threshold control. If the dynamic coring threshold is larger than the fixed highest coring threshold, then a fixed gain is used until the dynamic transfer function reaches a saturation phase. The various thresholds and gains are described as being fixed because while their values may be user-programmable, the values are not changed during operation. Further, different fixed threshold values and fixed gain values may be used by the frame dynamic coring component 324 and the field dynamic coring component 326.

The effect of the dynamic transfer function is as follows. The fixed lowest coring threshold is a low value selected to mostly favor spatial (2D) processing. In areas of detail as indicated by the value of the coring threshold control, the coring threshold is increased and the gain is decreased based on the coring threshold control, thus reducing the slope of the dynamic transfer function to favor temporal (3D) processing. Further, if the coring threshold exceeds the fixed highest coring threshold, a fixed gain is used that increases the slope of the dynamic transfer function to quickly transition the output of the dynamic transfer function to spatial processing.

Table 2 shows example pseudo code for determining the dynamic coring thresholds and gains of the frame dynamic coring component 324 and the field dynamic coring component 326 in one embodiment of the maximum filter component 206. In this pseudo code, kdet_vf is the coring threshold control, dy is the frame motion measure, and dy_f012_z1 is the field difference measure. Note that kdet_vf is scaled and limited before it is used to determine the dynamic coring thresholds. The values of mdt_f20_th1, mdt_f20_th2, mdt_f20_ga1, and mdt_f20_ga2 are, respectively, the fixed lowest coring threshold, the fixed highest coring threshold, the fixed highest gain, and the fixed gain for the frame dynamic coring component 324. The values of mdt_f012_th1, mdt_f012_th2, mdt_f012_ga1, and mdt_f012_ga2 are, respectively, the fixed lowest coring threshold, the fixed highest coring threshold, the fixed highest gain, and the fixed gain for the field dynamic coring component 326. Note that the fixed highest gains are scaled by factors of 2, 1.5, 1, and 0.5 with the increasing value of the coring threshold control kdet_vf, i.e., with increasing detail. The function dyn_coring is called to apply the dynamic transfer function. Example pseudo code for such a function is shown in Table 3.

TABLE 2

Dynamic Coring Thresholds and Gains

```
//Calculate dynamic thresholds for frame and field dynamic coring
th1_var = (kdet_vf * (mdt_kdet_var_th1_ga))>>4;
if (th1_var > (mdt_th1_var_lt))
    th1_var= (mdt_th1_var_lt);
dynamic_th1 = (DATA)(mdt_f20_th1) + (DATA)(th1_var);
dyn_f012_th = (DATA)(mdt_f012_th1) + (DATA)(th1_var);
//Calculate dynamic gain for frame dynamic coring
```

TABLE 2-continued

Dynamic Coring Thresholds and Gains

```
if (kdet_vf < mdt_sf_sc_thr1)
    dyn_ga1 = (mdt_f20_ga1)<<1; // goes from 2.6 to 3.6
else if (kdet_vf < mdt_sf_sc_thr2)
    dyn_ga1 = (mdt_f20_ga1) + ((mdt_f20_ga1)>>1);
else if (kdet_vf < mdt_sf_sc_thr3)
    dyn_ga1 = (mdt_f20_ga1);
else
    dyn_ga1 = (mdt_f20_ga1)>>1;
//Calculate dynamic gain for field dynamic coring
if (kdet_vf < mdt_sf_sc_thr1)
    dyn_ga1_f012 = (mdt_f012_ga1 )<<1; // goes from 2.6 to 3.6
else if (kdet_vf < mdt_sf_sc_thr2)
    dyn_ga1_f012 = (mdt_f012_ga1) + ((mdt_f012_ga1)>>1);
else if (kdet_vf < mdt_sf_sc_thr3)
    dyn_ga1_f012 = (mdt_f012_ga1);
else
    dyn_ga1_f012 = (mdt_f012_ga1)>>1;
if (dyn_ga1 >= 255)
    dynamic_ga1 = 255;
else
    dynamic_ga1 = dyn_ga1;
if (dyn_ga1_f012 >= 255)
    dynamic_ga1_f012 = 255;
else
    dynamic_ga1_f012 = dyn_ga1_f012;
dyn_coring(mv_fi02,dy,dynamic_th1,dynamic_ga1,
        (mdt_f20_th2),(mdt_f20_ga2));
dyn_coring(mv_fi012,dy_f012_z1,dyn_f012_th,dynamic_ga1_f012,
        (mdt_f012_th2),(mdt_f012_ga2));
```

Table 3 shows example pseudo code for applying the dynamic transfer function to map the frame motion measure to a frame motion parameter and the field difference measure to a field motion parameter in one embodiment of the maximum filter component 206. In this pseudo code, th1 is the dynamic coring threshold, th2 is the fixed highest coring threshold, ga1 is the dynamic gain, ga2 is the fixed gain, dy is the motion value to be mapped, and km is the resulting motion parameter.

TABLE 3

Dynamic Transfer Function

```
dy_th1 = (dy - th1);
dy_th2 = (dy - (DATA)(th2));
dth21 = (DATA)(th2) - th1;
offset = ((DATA)ga1*dth21) >> 6; // gain is 2.6; so add 3 bits
if (dth21 > 0){
        if (dy_th1<0) {
                use_delta = (SDATA)0;
                use_gain = (UINT_8)0;
                use_offset = (INT_16)0;
                out_b = (UINT_4)0;
        } else if (dy_th2 <0) {
                use_delta = dy_th1;
                use_gain = ga1;
                use_offset = (INT_16)0;
                out_b = (UINT_4)15;
        } else {
                use_delta = dy_th2;
                use_gain = (ga2);
                use_offset = offset;
                out_b = (UINT_4)15;
        }
} else {
        if (dy_th2<0) {
                use_delta = (SDATA)0;
                use_gain = (UINT_8)0;
                use_offset = (INT_16)0;
                out_b = (UINT_4)0;
        } else {
                use_delta = dy_th2;
                use_gain = (ga2);
```

TABLE 3-continued

Dynamic Transfer Function

```
                use_offset = (INT_16)0;
                out_b = (UINT_4)15;
        }}
mv_smdei_a = use_offset + ((use_gain*abs(use_delta)) >> 6); // gain is 2.6
if (mv_smdei_a > (UINT_16)15)
        km = (UINT_4)15;
else
        km = (UINT_4)mv_smdei_a
```

Referring back to the maximum filter component 206 in FIG. 3, the frame motion parameter and the field motion parameter are provided to a counter update component 328. The counter update component 328 updates a counter for the interpolated pixel based on the relative values of the frame motion parameter and the field motion parameter. The current counter value for the pixel is retrieved from the frame memory 210 (FIG. 2). The frame memory 210 stores a counter for each pixel in a de-interlaced frame.

The counters and the field motion parameters are used to effect a slow transition from spatial processing of a pixel to temporal processing of the pixel when the frame motion measures for the pixel are low but the field difference measures are high across multiple sequential frames in the video. More specifically, as was previously mentioned, for pixels where there is a high level of detail with very small motion, e.g., motion on the order of 1 pixel, temporal processing is preferred. The value of the slow motion frame difference measure in combination with motion mixture control indicates when such a condition is likely present in a scene and will cause the frame motion measure to be small even if the frame difference measure is large. The presence of the high level of detail will also drive the coring threshold control to increase the dynamic coring threshold such that the resulting frame motion parameter for the small frame motion measure is 0, requiring the use of temporal processing.

However, there are cases when very fast or oscillatory motion in a scene will result in the frame difference measure being 0, and the frame motion parameter being 0. Because there is actually motion in the scene, it would be preferable to use spatial processing. In such cases, the same object occupies a location in f0 and f2 but not in f1. The field difference measure is used to identify the possibility that such motion is present in the scene. In such cases, the field difference measure will be high. In the absence of other complicating factors, the high field difference measure would be sufficient to distinguish these cases and spatial processing could be forced. However, as a further complication, there are also cases when there are almost stationary objects in a scene where the pixels in odd fields are identical and the pixels in even fields are identical, e.g., a rotating multi-colored object. In such cases, the frame difference measure will be zero and the field difference measure will be high. However, better results are achieved by using temporal processing for theses pixels. The differentiator here is that the probability of a frame difference measure of 0 and a high field difference measure existing in the given pixel location for very many frames is low if there is fast or oscillatory motion and high if the motion is almost stationary.

Because there is doubt about which of the above situations is present in a scene when the frame difference measure is zero but the field difference measure is non-zero, rather than immediately transitioning to temporal processing in view of the preference for temporal processing indicated in the frame difference measure, a slow transition from spatial processing to temporal processing over several frames is preferred.

In the maximum filter component 206, the slow transition from spatial processing to temporal processing when the frame difference measure is zero but the field difference measure is high is handled as follows. The counter update component 328 maintains a counter for each pixel in a frame in the frame memory 206. Initially, each counter is 0. The counter update component 328 increments the counter for a pixel if the frame motion parameter is 0 and the field motion parameter is not zero. If the frame motion parameter is not zero or the field motion parameter is zero, the counter update component 328 sets the counter is set to 0. Further, once the counter reaches a maximum value, the counter update component 328 maintains that counter at the maximum value until the conditions are encountered to reset the counter to 0.

The scale component 330 uses the updated counter value generated by the counter update component 328 to scale the field motion parameter such that the higher the value of the counter, the more the value of the field motion parameter is reduced. The maximum 332 of the scaled field motion parameter and the frame motion parameter is then selected as the motion parameter (mv_hm) for the pixel.

Table 4 shows example pseudo code for updating a pixel counter and scaling the field motion parameter in one embodiment of the maximum filter component 206. In the pseudo code, mv_fi02 is the frame motion parameter, mv_fi012 is the field motion parameter, stored_count is the current count from the frame memory, and mv_smdei is the resulting motion parameter for the pixel.

TABLE 4

Pixel Counter Update and Field Motion Parameter Scaling

```
if ((mv_fi02 == 0) && (mv_fi012 > 0))
        count = stored_count + 1;
    else
        count = 0;
    if (count > 7) count = 7;
    count_out = count;
if (count == 0) shift = (mdt_fikm_rtshift0); //0;
else if (count == 1) shift = (mdt_fikm_rtshift1); //0
else if (count == 2) shift = (mdt_fikm_rtshift2); //1
else if (count == 3) shift = (mdt_fikm_rtshift3); //1
else if (count == 4) shift = (mdt_fikm_rtshift4); //2
else if (count == 5) shift = (mdt_fikm_rtshift5); //3
else if (count == 6) shift = (mdt_fikm_rtshift6); //4
else shift = (mdt_fikm_rtshift7); //5
        mv_field = mv_fi012 >> shift;
        if (mv_fi02 > mv_field)
            mv_smdei = mv_fi02;
        else
            mv_smdei = mv_field;
```

In one embodiment, a (1,2,1) low pass filter is applied to the resulting motion parameter. The example pseudo code of Table 5 shows this filtering. In this pseudo code, mv_sm_max3[0] is the 1 pixel delayed value of mv_smdei, mv_sm_max3[1] is the current value of mv_smdei, and mv_sm_max3[2] is the 2 pixel delayed value of mv_smdei.

TABLE 5

Motion Parameter Filter

```
mv_smdei_z1 =
(mv_sm_max3[0]+(mv_sm_max3[1]<<1)+mv_sm_max3[2])>>1;
    if (mv_smdei_z1 > 15) mv_smdei_z1 = 15;
```

Referring back to the maximum filter component 206 in FIG. 3, the vertical temporal maximum filter component 334 then applies a temporal maximum filter to the motion parameter. The temporal maximum filter selects the maximum of the current motion parameter (mv_hm), the 1-field delayed motion parameter for the pixel (mv_hm_1fd), and the 2-field delayed motion parameter for the pixel (mv_hm_2fd) as the final motion parameter (mvstm). The field delayed motion parameters for each pixel position in a field are maintained in the field memories 212, 214 (FIG. 2).

Figure 12:
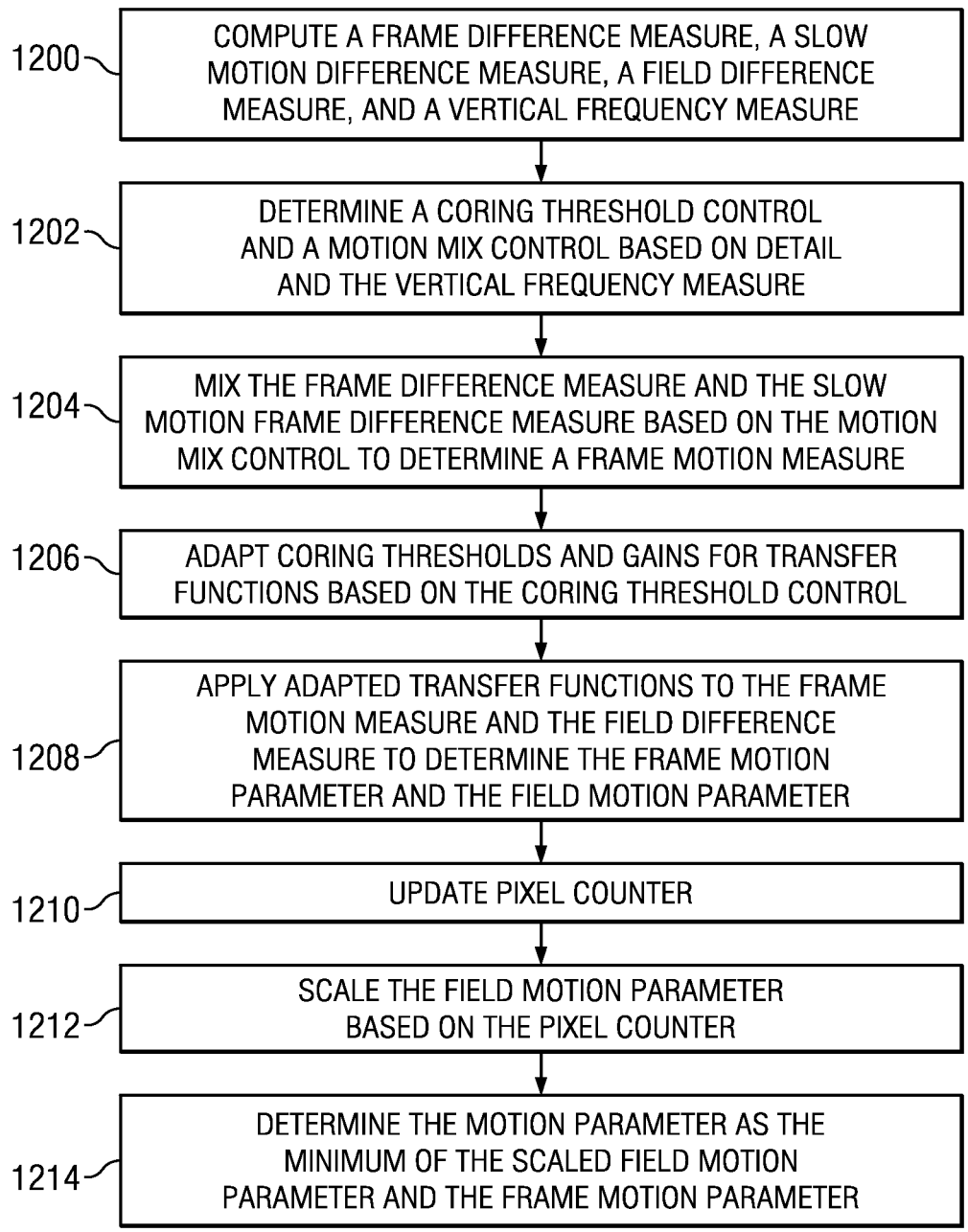
FIG. 12 shows a flow diagram of a method for motion detection.

FIG. 12 shows a flow diagram of a method for motion detection in de-interlacing. The method may be applied to each interpolated pixel in a field of an interlaced frame of video data to generate a motion parameter for the interpolated pixel suitable for use in interpolating a value for the interpolated pixel in a corresponding de-interlaced, i.e., progressive, video frame. Initially, a frame difference measure, a slow motion difference measure, a field difference measure, and a vertical frequency measure are computed based on a pixel neighborhood of the interpolated pixel 1200. The neighboring pixels used in the computation of each of these measures may be different for each measure computation. Computation of these measures is previously described herein.

A coring threshold control and a motion mix control are then determined based on the amount of detail in the pixel neighborhood and the vertical frequency measure 1202. To determine the detail in the pixel neighborhood, a spatial activity measure, a local detail measure, edge strength measures, and an edge complexity measure are computed. The neighboring pixels used in the computation of each of these measures may be different for each measure computation. Computation of the coring threshold control and the motion mix control is previously described herein.

The frame difference measure and the slow motion frame difference measure are mixed based on the motion mix control to determine a frame motion measure 1204. The mixing of the frame difference measure and the slow motion frame difference measure is previously described herein.

The coring thresholds and highest gains for the transfer functions used to determine the frame motion parameter and the field motion parameter are adapted based on the coring threshold control 1206. The coring threshold and highest gain may be different for the field motion parameter and the frame motion parameter. Adaptation of the coring thresholds and the highest gains is previously described herein.

The adapted transfer functions are then applied to the frame motion measure and the field difference measure to determine the frame motion parameter and the field motion parameter 1208. Applying the transfer functions is previously described herein.

The pixel counter for the interpolated pixel is then updated based on the frame motion parameter and the field motion parameter 1210. The rationale behind the pixel counter and the updating criteria are previously described herein.

The field motion parameter is then scaled based on the updated pixel counter 1212. Scaling of the field motion parameter is previously described herein.

The motion parameter for the interpolated pixel is then determined as the minimum of the scaled field motion parameter and the frame motion parameter 1214. This motion parameter may be passed through a temporal maximum filter to generate the final motion parameter. Application of the temporal maximum filter to the motion parameter is previously described herein.

Figure 13:
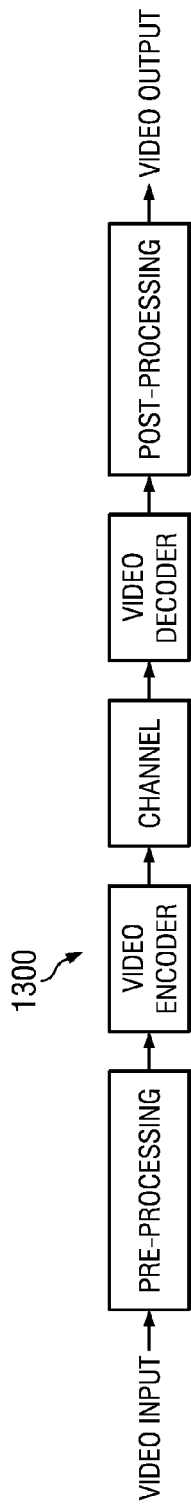
FIG. 13 shows a block diagram of an illustrative video communication system.

FIG. 13 is a block diagram illustrating a high-level signal chain of a video communication system 1300. Embodiments of the motion detection described herein may be applied in pre-processing to improve image quality and coding efficiency of the video encoder. Embodiments of the motion detection may also be applied in post-processing after decoding by the video decoder to improve the quality of displayed images.

Figure 14:
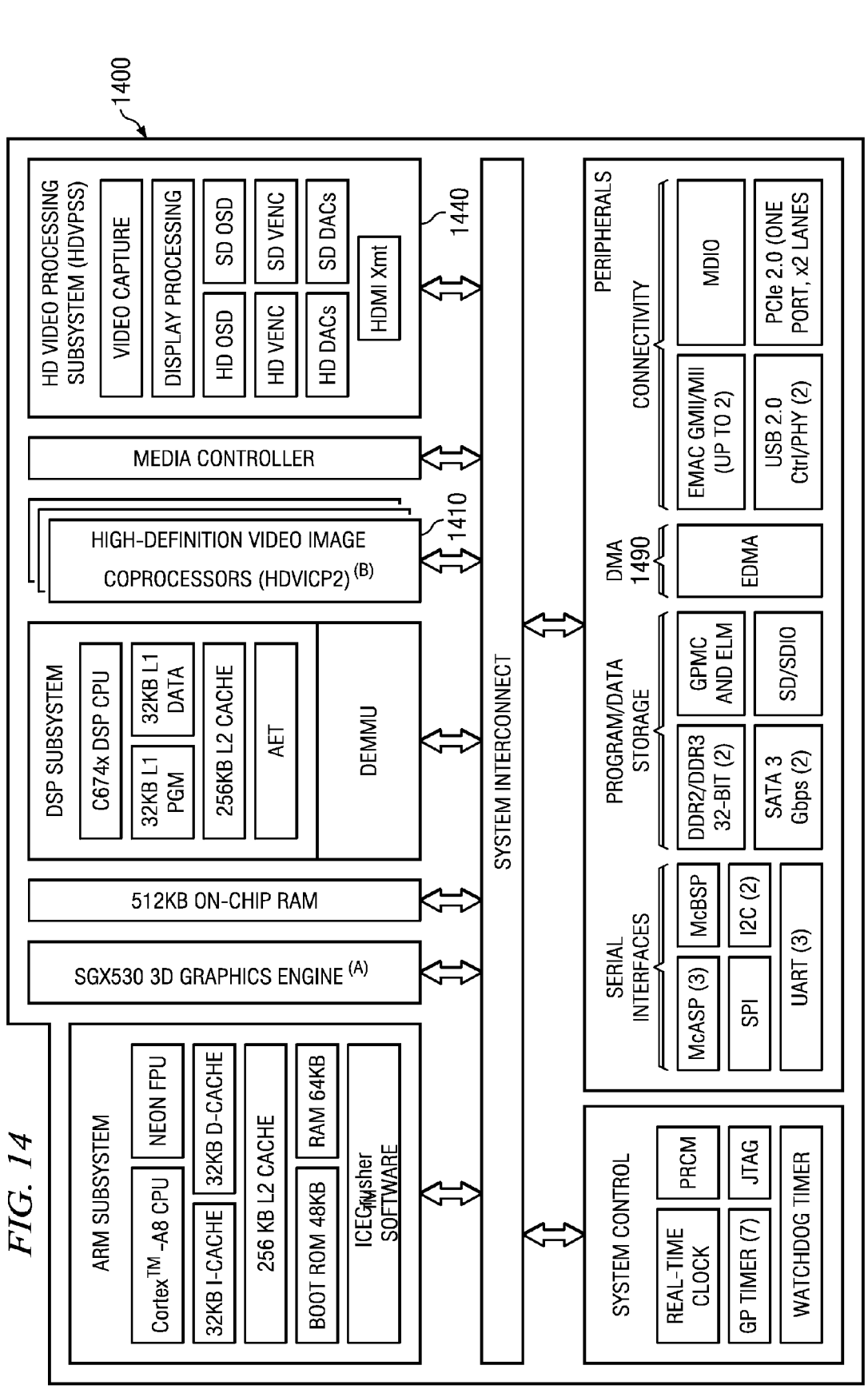
FIG. 14 shows a block diagram of an illustrative digital system.

FIG. 14 is a block diagram of an example SoC 1400 that may include an embodiment of the motion detection system and method described herein. This example SoC is representative of one of a family of DaVinci™ Digital Media Processors, available from Texas Instruments, Inc. This example is described in more detail in "TMS320DM816x DaVinci Digital Media Processors Data Sheet, SPRS614", Mar., 2011 which is incorporated by reference herein and is described briefly below.

The Digital Media Processors (DMP) 1400 is a highly-integrated, programmable platform that meets the processing needs of applications such as the following: Video Encode/Decode/Transcode/Transrate, Video Security, Video Conferencing, Video Infrastructure, Media Server, and Digital Signage, etc. DMP 1400 may include multiple operating systems support, multiple user interfaces, and high processing performance through the flexibility of a fully integrated mixed processor solution. The device combines multiple processing cores with shared memory for programmable video and audio processing with a highly-integrated peripheral set on common integrated substrate.

HD Video Processing Subsystem (HDVPSS) 1440 includes multiple video input ports that operate in conjunction with DMA engine 1490 to receive streams of video data. HDVPSS 1440 preprocesses the video streams prior to encoding by coprocessor 1410. A de-interlacing module that incorporates an embodiment of motion detection as described herein is included within HDVPSS 1440.

DMP 1400 may include up to three high-definition video/imaging coprocessors (HDVICP2) 1410. Each coprocessor can perform a single 1080p60 H.264 encode or decode or multiple lower resolution or frame rate encodes/decodes. Ultichannel HD-to-HD or HD-to-SD transcoding along with multi-coding are also possible.

Figure 15:
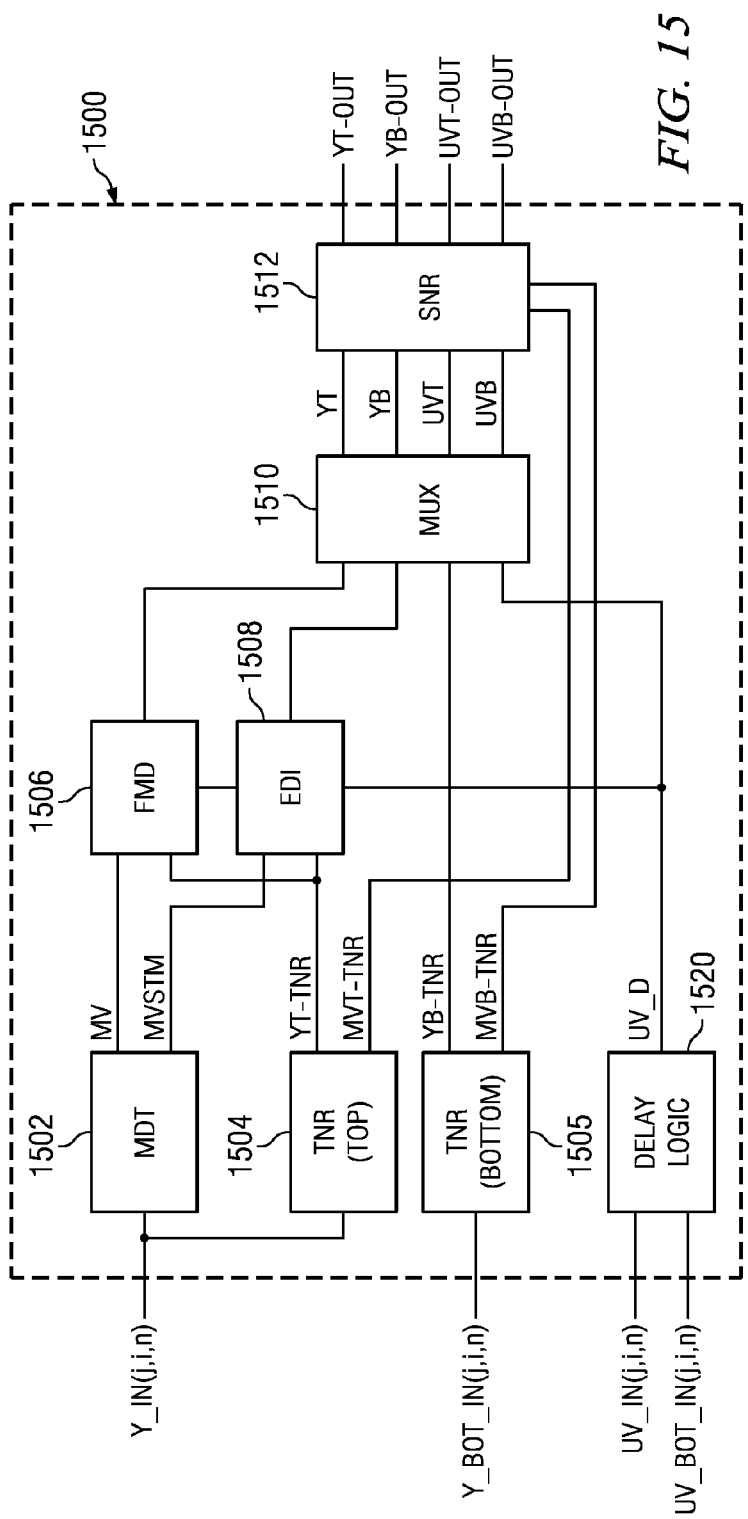
FIG. 15 shows a block diagram of an illustrative de-interlacing module.

FIG. 15 is a block diagram of de-interlacing module 1500 that includes an embodiment of the motion detection module 200. De-interlacing module 1500 may be included, for example, within post-processing of FIG. 13 for a system that receives broadcast TV video, such as a set-top box for cable or satellite video capture sources. The de-interlacing module 1500 includes motion detection module 1502 that may be an embodiment of the motion detection module 200.

Two temporal noise reduction modules (TNR) 1504, 1505 are included that also perform motion detection. When a progressive frame video signal is received from the video source, both TNR modules output two motion values, mv_tnr_top, mv_tnr_bot, to spatial noise reduction (SNR) module 1512. When an interlaced video signal is received, TNR 1504 is used for temporal noise reduction; TNR 1505 is used to generate motion value, mv_tnr, for the SNR module.

Edge directed interpolation (EDI) module 1508 produces edge detection information for use in pixel interpolation using motion information (MVstm) from MDT 1502, temporal filtered line information YT_TNR from TNR 1504, and chroma information from delay logic 1520. Film mode detection (FMD) module 1506 performs film mode detection that is useful for optimizing a video stream that was converted from 24 frame per second film format to 30 frame per second TV format. Multiplexor (MUX) module 1510 receives information for two lines of data from the various modules and forms a frame by adjusting the order of the two lines (which is the top line and which is the bottom line depending on the control signal obtained from the input) and the FMD module 1506 output. The outputs are then sent to SNR module 1512 for noise reduction.

Other Embodiments

While the invention has been described with reference to illustrative embodiments, this description is not intended to be construed in a limiting sense. Various other embodiments of the invention will be apparent to persons skilled in the art upon reference to this description. For example, other types of filters and/or larger or smaller pixel neighborhoods and/or differing neighboring pixels may be used to determine the various difference values, detail measures, and edge measures.

Embodiments of the motion detection systems and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the video signal processing. Analog-to-digital converters and digital-to-analog converters provide coupling to the real world, modulators and demodulators (plus antennas for air interfaces) can provide coupling for waveform reception of video data being broadcast over the air by satellite, TV stations, cellular networks, etc or via wired networks such as the Internet and cable TV.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope of the invention.

TABLE 6

Difference Computations

```
// Apply (121) low pass filter to up, mid, down pixels in f0 and f2
upf0_avg = (up_f0[0] + (up_f0[1] <<1) + up_f0[2]) >> 2;
midf0_avg = (mid_f0[0] + (mid_f0[1] <<1) + mid_f0[2]) >> 2;
downf0_avg = (down_f0[0] + (down_f0[1] <<1) + down_f0[2]) >> 2;
upf2_avg = (up_f2[0] + (up_f2[1] <<1) + up_f2[2]) >> 2;
midf2_avg = (mid_f2[0] + (mid_f2[1] <<1) + mid_f2[2]) >> 2;
downf2_avg = (down_f2[0] + (down_f2[1] <<1) + down_f2[2]) >> 2;
// Calculate vertical frequency
// Making approximation here with adjoining fields to use 3 pixels
vf_f0 = (upf0_avg - (midf0_avg <<1) + downf0_avg) >> 2;
vf_f2 = (upf2_avg - (midf2_avg <<1) + downf2_avg) >> 2;
if (vf_f0 < 0) vf_f0 = -vf_f0; //abs
if (vf_f2 < 0) vf_f2 = -vf_f2;
if (vf_f0 < vf_f2)
        vf_f02 = vf_f0;
else    vf_f02 = vf_f2;
vf_f02a = (vf_f02 - mdt_vf_th);
if (vf_f02a < 0)
        vf_offset = 0;
else
        vf_offset = (vf_f02a*(mdt_vf_ga)) >>3; // (unsigned mult)
// Calculate direct frame difference
dy_f02_a = abs(mid_f0[1]-mid_f2[1]);
// Calculate filtered frame difference
pixfilt_f0_lf = (upf0_avg + (midf0_avg <<1) + downf0_avg) >> 2;
pixfilt_f0_hf = (mid_f0[1] - pixfilt_f0_lf);
if (abs(pixfilt_f0_hf) <= mdt_pixflt_hf_core)
        pixfilt_f0 = pixfilt_f0_lf;
else
        pixfilt_f0 = pixfilt_f0_lf+pixfilt_f0_hf;
pixfilt_f2_lf = (upf2_avg + (midf2_avg <<1) + downf2_avg) >> 2;
pixfilt_f2_hf = (mid_f2[1] - pixfilt_f2_lf);
if (abs(pixfilt_f2_hf) <= mdt_pixflt_hf_core)
        pixfilt_f2 = pixfilt_f2_lf;
else
        pixfilt_f2 = pixfilt_f2_lf+pixfilt_f2_hf;
dy_f02_filt = abs(pixfilt_f0 - pixfilt_f2);
// Calculate frame difference
if (dy_f02_filt < dy_f02_a)
        dy_f02 = dy_f02_filt;
else
        dy_f02 = dy_f02_a;
// slow motion of mid_f0[1] center of field 0
dy_slf0[0] = abs(mid_f0[1] - top_f1[0]);
dy_slf0[1] = abs(mid_f0[1] - top_f1[1]);
dy_slf0[2] = abs(mid_f0[1] - top_f1[2]);
dy_slf0[3] = abs(mid_f0[1] - bot_f1[0]);
dy_slf0[4] = abs(mid_f0[1] - bot_f1[1]);
dy_slf0[5] = abs(mid_f0[1] - bot_f1[2]);
dy_slf0[6] = abs(mid_f0[1] - up_f2[0]);
dy_slf0[7] = abs(mid_f0[1] - up_f2[1]);
dy_slf0[8] = abs(mid_f0[1] - up_f2[2]);
dy_slf0[9] = abs(mid_f0[1] - down_f2[0]);
dy_slf0[10] = abs(mid_f0[1] - down_f2[1]);
dy_slf0[11] = abs(mid_f0[1] - down_f2[2]);
dy_slf0[12] = abs(mid_f0[1] - mid_f2[0]);
dy_slf0[13] = abs(mid_f0[1] - mid_f2[2]);
dy_min_slf[0] = min14<DATA>(dy_slf0);
// slow motion of mid_f2[1] center of field 2
dy_slf2[0] = abs(mid_f2[1] - top_f1[0]);
dy_slf2[1] = abs(mid_f2[1] - top_f1[1]);
dy_slf2[2] = abs(mid_f2[1] - top_f1[2]);
dy_slf2[3] = abs(mid_f2[1] - bot_f1[0]);
dy_slf2[4] = abs(mid_f2[1] - bot_f1[1]);
dy_slf2[5] = abs(mid_f2[1] - bot_f1[2]);
dy_slf2[6] = abs(mid_f2[1] - up_f0[0]);
dy_slf2[7] = abs(mid_f2[1] - up_f0[1]);
dy_slf2[8] = abs(mid_f2[1] - up_f0[2]);
dy_slf2[9] = abs(mid_f2[1] - down_f0[0]);
dy_slf2[10] = abs(mid_f2[1] - down_f0[1]);
dy_slf2[11] = abs(mid_f2[1] - down_f0[2]);
dy_slf2[12] = abs(mid_f2[1] - mid_f0[0]);
dy_slf2[13] = abs(mid_f2[1] - mid_f0[2]);
dy_min_slf[1] = min14<DATA>(dy_slf2);
dy_slomo = minn<DATA,2>(dy_min_slf);
// Calculate field difference
fi0_filt = (up_f0[1] + (mid_f0[1] <<1) + down_f0[1])>>2;
fi1_filt = (top_f1[1] + bot_f1[1]) >>1;
fi2_filt = (up_f2[1] + (mid_f2[1] <<1) + down_f2[1])>>2;
fi01_dif = abs(fi0_filt - fi1_filt);
fi21_dif = abs(fi2_filt - fi1_filt);
if (fi01_dif>fi21_dif)
        dy_f012 = fi01_dif;
else
        dy_f012 = fi21_dif; }
```

TABLE 7

Spatial Activity

```
act_count = 0;
//same frame (f1) detail
if (abs(mid_ec[2]-mid_ec[1]) >= mdt_act_th) act_count = act_count+1;
if (abs(mid_ec[2]-mid_ec[3]) >= mdt_act_th) act_count = act_count+1;
if (abs(mid_ec[2]-top_ec[2]) >= mdt_act_th) act_count = act_count+1;
if (abs(mid_ec[2]-bot_ec[2]) >= mdt_act_th) act_count = act_count+1;
if (abs(mid_ec[2]-top_ec[1]) >= mdt_act_th) act_count = act_count+1;
if (abs(mid_ec[2]-top_ec[3]) >= mdt_act_th) act_count = act_count+1;
if (abs(mid_ec[2]-bot_ec[1]) >= mdt_act_th) act_count = act_count+1;
if (abs(mid_ec[2]-bot_ec[3]) >= mdt_act_th) act_count = act_count+1;
if (abs(mid_ec[1]-top_ec[1]) >= mdt_act_th) act_count = act_count+1;
if (abs(mid_ec[1]-bot_ec[1]) >= mdt_act_th) act_count = act_count+1;
if (abs(mid_ec[3]-top_ec[3]) >= mdt_act_th) act_count = act_count+1;
if (abs(mid_ec[3]-bot_ec[3]) >= mdt_act_th) act_count = act_count+1;
if (abs(mid_ec[0]-top_ec[1]) >= mdt_act_th) act_count = act_count+1;
if (abs(mid_ec[0]-bot_ec[1]) >= mdt_act_th) act_count = act_count+1;
if (abs(mid_ec[1]-top_ec[0]) >= mdt_act_th) act_count = act_count+1;
if (abs(mid_ec[1]-bot_ec[0]) >= mdt_act_th) act_count = act_count+1;
if (abs(mid_ec[3]-top_ec[4]) >= mdt_act_th) act_count = act_count+1;
if (abs(mid_ec[3]-bot_ec[4]) >= mdt_act_th) act_count = act_count+1;
if (abs(mid_ec[4]-top_ec[3]) >= mdt_act_th) act_count = act_count+1;
if (abs(mid_ec[4]-bot_ec[3]) >= mdt_act_th) act_count = act_count+1;
if (abs(top_ec[2]-top_ec[1]) >= mdt_act_th) act_count = act_count+1;
if (abs(top_ec[2]-top_ec[3]) >= mdt_act_th) act_count = act_count+1;
if (abs(bot_ec[2]-bot_ec[1]) >= mdt_act_th) act_count = act_count+1;
if (abs(bot_ec[2]-bot_ec[3]) >= mdt_act_th) act_count = act_count+1;
/* adjacent frame (f2) detail (same as top 20 of above) */
if (abs(mid_adj[2]-mid_adj[1]) >= mdt_act_th) act_count = act_count+1;
```

TABLE 7-continued

| Spatial Activity |
|---|
| if (abs(mid_adj[2]−mid_adj[3]) >= mdt_act_th) act_count = act_count+1;<br>if (abs(mid_adj[2]−top_adj[2]) >= mdt_act_th) act_count = act_count+1;<br>if (abs(mid_adj[2]−bot_adj[2]) >= mdt_act_th) act_count = act_count+1;<br>if (abs(mid_adj[2]−top_adj[1]) >= mdt_act_th) act_count = act_count+1;<br>if (abs(mid_adj[2]−top_adj[3]) >= mdt_act_th) act_count = act_count+1;<br>if (abs(mid_adj[2]−bot_adj[1]) >= mdt_act_th) act_count = act_count+1;<br>if (abs(mid_adj[2]−bot_adj[3]) >= mdt_act_th) act_count = act_count+1;<br>if (abs(mid_adj[1]−top_adj[1]) >= mdt_act_th) act_count = act_count+1;<br>if (abs(mid_adj[1]−bot_adj[1]) >= mdt_act_th) act_count = act_count+1;<br>if (abs(mid_adj[3]−top_adj[3]) >= mdt_act_th) act_count = act_count+1;<br>if (abs(mid_adj[3]−bot_adj[3]) >= mdt_act_th) act_count = act_count+1;<br>if (abs(mid_adj[0]−top_adj[1]) >= mdt_act_th) act_count = act_count+1;<br>if (abs(mid_adj[0]−bot_adj[1]) >= mdt_act_th) act_count = act_count+1<br>if (abs(mid_adj[1]−top_adj[0]) >= mdt_act_th) act_count = act_count+1;<br>if (abs(mid_adj[1]−bot_adj[0]) >= mdt_act_th) act_count = act_count+1;<br>if (abs(mid_adj[3]−top_adj[4]) >= mdt_act_th) act_count = act_count+1;<br>if (abs(mid_adj[3]−bot_adj[4]) >= mdt_act_th) act_count = act_count+1;<br>if (abs(mid_adj[4]−top_adj[3]) >= mdt_act_th) act_count = act_count+1;<br>if (abs(mid_adj[4]−bot_adj[3]) >= mdt_act_th) act_count = act_count+1; |

TABLE 8

| Edge Detection |
|---|
| /* Detect possible edge */<br>//direction 6m<br>dir_a[0] = ( abs(top_ec[0] − mid_ec[4]) + abs(mid_ec[0] − bot_ec[4])) >> 1;<br>//direction 5m<br>dir_a[1] = ( abs(top_ec[0] − mid_ec[3]) + abs(top_ec[1] − mid_ec[4]) + abs(mid_ec[0] − bot_ec[3]) + abs(mid_ec[1] − bot_ec[4])) >> 2;<br>//direction 4m<br>dir_a[2] = ( abs(top_ec[0]−mid_ec[2]) + abs(top_ec[2] − mid_ec[4]) + abs(mid_ec[0] − bot_ec[2]) + abs(mid_ec[2] − bot_ec[4])) >> 2;<br>//direction 3m<br>dir_a[3] = ( abs(top_ec[1] − mid_ec[2]) + abs(top_ec[3] − mid_ec[4]) + abs(mid_ec[0] − bot_ec[1]) + abs(mid_ec[2] − bot_ec[3])) >> 2;<br>//direction 2m<br>dir_a[4] = ( abs(top_ec[0] − bot_ec[1]) + abs(top_ec[1] − bot_ec[2]) + abs(top_ec[2] − bot_ec[3]) + abs(top_ec[3] − bot_ec[4])) >> 2;<br>//direction 1<br>dir_a[5] = ( abs(bot_ec[2] − mid_ec[2]) + abs(bot_ec[0] − top_ec[0]) + abs(bot_ec[4] − top_ec[4]) + abs(mid_ec[2] − top_ec[2])) >> 2;<br>//direction 2p<br>dir_a[6] = ( abs(top_ec[1] − bot_ec[0]) + abs(top_ec[2] − bot_ec[1]) + abs(top_ec[3] − bot_ec[2]) + abs(top_ec[4] − bot_ec[3])) >> 2;<br>//direction 3p<br>dir_a[7] = ( abs(top_ec[1] − mid_ec[0]) + abs(top_ec[3] − mid_ec[2]) + abs(mid_ec[2] − bot_ec[1]) + abs(mid_ec[4] − bot_ec[3])) >> 2;<br>//direction 4p<br>dir_a[8] = ( abs(top_ec[2] − mid_ec[0]) + abs(top_ec[4] − mid_ec[2]) + abs(mid_ec[2] − bot_ec[0]) + abs(mid_ec[4] − bot_ec[2])) >> 2;<br>//direction 5p<br>dir_a[9] = ( abs(top_ec[3] − mid_ec[0]) + abs(top_ec[4] − mid_ec[1]) + abs(mid_ec[3] − bot_ec[0]) + abs(mid_ec[4] − bot_ec[1])) >> 2;<br>//direction 6p<br>dir_a[10] = ( abs(top_ec[4] − mid_ec[0]) + abs(mid_ec[4] − bot_ec[0])) >> 1;<br>min_dir = min11<DATA>(dir_a);<br>max_dir = max11 <DATA>(dir_a);<br>// edge strength<br>edge_mag1 = (abs(max_dir - min_dir) − mdt_edg_th);<br>if (edge_mag1 < 0){<br>    edge_mag = 0;<br>    edge_mag_varth = 0;<br>}else{<br>    edge_mag = edge_mag1>>(mdt_edg_rtshift);<br>    edge_mag_varth = edge_mag1>>(mdt_edg_rtshift_varth);}<br>//edge complexity<br>dir_b[0] = dir_a[0];<br>dir_b[1] = dir_a[0];<br>for (dirm=0; dirm<11; dirm++){dir_b[dirm+2] = dir_a[dirm];}<br>dir_b[13] = dir_a[10];<br>dir_b[14] = dir_a[10];<br>for (dirn=2; dirn<13; dirn++){dir[dirn−2] = (dir_b[dirn−1] + (dir_b[dirn]<<1) + dir_b[dirn + 1])>>2;}<br>for (diri=0; diri<10; diri++){ |

TABLE 8-continued

| Edge Detection |
|---|

```
        if((dir[diri+1]-dir[diri])>0)
              dir_dif[diri] = 1;
        else
              dir_dif[diri] = 0;}
edge_det3 = 0;
for (dirj=0; dirj<9; dirj++){
if(dir_dif[dirj+1] != dir_dif[dirj])
      edge_det3 = edge_det3+1;}
//Reduce activity count based on edge complexity, strength for motion mix control
if (edge_det3<=1)
      act_cnt_mix_l = act_count-(mdt_act_det_th1)-edge_mag; //14;
else if (edge_det3==2)
      act_cnt_mix_l = act_count-(mdt_act_det_th2)-(edge_mag>>2);//7;
else
      act_cnt_mix_l = act_count;
if (act_cnt_mix _l <0) act_cnt_mix = 0;
else if (act_cnt_mix_l > 16) act_cnt_mix = 16;
else act_cnt_mix = act_cnt_mix_l;
```

TABLE 9

| Local Activity and Controls |
|---|

```
// Calculate local activity around pixel
y_detail = ( (((abs(top_f1f2[2] - bot_f1f2[2]) +
      abs(top_f1f2[1] - bot_f1f2[2]) +
      abs(top_f1f2[3] - bot_f1f2[2]) +
      abs(top_f1f2[2] - bot_f1f2[1]) +
      abs(top_f1f2[2] - bot_f1f2[3])) << 1) +
      (abs(top_f1f2[1] - top_f1f2[2]) +
      abs(top_f1f2[2] - top_f1f2[3]) +
      abs(bot_f1f2[1] - bot_f1f2[2]) +
      abs(bot_f1f2[2] - bot_f1f2[3]) +
      abs(top_f1f2[1] - bot_f1f2[1]) +
      abs(top_f1f2[3] - bot_f1f2[3])))>>4;
y_det_above_th = (y_detail - mdt_y_det_th);
if (y_det_above_th < 0)
      y_det_l = 0;
else
      y_det_l = (y_det_above_th * mdt_y_det_ga) >> 2;
if (y_det_l > MAX_DATA)
      y_det = MAX_DATA;
else
      y_det = y_det_l;
//Reduce activity count based on edge complexity, strength for coring threshold control
if (edge_det3<=1)
      act_cnt_core_l= act_count - (mdt_act_det_th3)- edge_mag_varth;
else if (edge_det3==2)
      act_cnt_core_l=act_count-(mdt_act_det_th3)-(edge_mag_varth>>2); //7;
else
      act_cnt_core_l = act_count;
if (act_cnt_core_l < 0)
      act_cnt_core = 0;
else if (act_count_edg_l > MAX_DATA)
      act_cnt_core = MAX_DATA;
else
      act_cnt_core = act_cnt_core_l;
//Determine controls
if (y_det < act_cnt_core) //these are not limited to 16 to provide more range for shift;
      kdet = y_det;
else
      kdet = act_cnt_core;
if (y_det > 16)
      y_det = 16;
if (y_det < act_cnt_mix)
      kd = y_det;
else
      kd = act_cnt_mix;
```

What is claimed is:

1. A method for motion detection, the method comprising:
   determining a first motion measure for a pixel based on differences between first neighboring pixels of the pixel, wherein determining a first motion measure comprises determining a frame difference measure for the pixel based on a subset of the first neighboring pixels, determining a slow motion frame difference measure for the pixel based on the first neighboring pixels, and mixing the frame difference measure and the slow motion frame difference measure based on the detail measure to generate the first motion measure;
   determining a detail measure for the pixel, wherein the detail measure is indicative of an amount of detail in second neighboring pixels of the pixel;
   adapting a first coring threshold and a first gain of a first transfer function based on the detail measure; and
   using the adapted first transfer function to map the first motion measure to a first motion parameter.

2. The method of claim 1, wherein determining a detail measure further comprises:
   determining a spatial activity measure based on the second neighboring pixels;
   determining a local detail measure based on immediately neighboring pixels in the second neighboring pixels;
   determining an edge complexity measure and an edge strength measure based on a subset of the second neighboring pixels,
   wherein the detail measure is determined based on the spatial activity measure, the local detail measure, the edge complexity measure, and the edge strength measure.

3. The method of claim 1, wherein adapting a first coring threshold and a first gain further comprises:
   increasing the first coring threshold and reducing the first gain based on the amount of detail indicated by the detail measure.

4. The method of claim 1, further comprising:
   determining a second motion measure for the pixel based on differences between third neighboring pixels of the pixel, wherein the third neighboring pixels comprise the first neighboring pixels;
   adapting a second coring threshold and a second gain of a second transfer function based on the detail measure;
   using the adapted second transfer function to map the second motion measure to a second motion parameter;
   scaling the second motion parameter when the second motion measure is high and the first motion measure is low; and
   selecting the minimum of the first motion parameter and scaled second motion parameter as a motion parameter for the pixel.

5. The method of claim 1, wherein the pixel is an interpolated pixel.

6. A video processing system comprising a motion detection module, wherein the motion detection module comprises:
   means for determining a first motion measure for a pixel based on differences between first neighboring pixels of the pixel;
   means for determining a detail measure for the pixel, wherein the detail measure is indicative of an amount of detail in second neighboring pixels of the pixel;
   means for adapting a first coring threshold and a first gain of a first transfer function based on the detail measure; and
   means for using the adapted first transfer function to map the first motion measure to a first motion parameter.

7. A method for motion detection, the method comprising:
   determining a frame motion measure for an interpolated pixel in a field f1;
   determining a detail measure for the interpolated pixel, wherein the detail measure is indicative of an amount of detail in spatially and temporally neighboring pixels of the interpolated pixel in the field f1 and a following field f2;
   adapting a frame coring threshold and a frame highest gain of a frame transfer function based on the detail measure; and
   using the adapted frame transfer function to map the frame motion measure to a frame motion parameter.

8. The method of claim 7, further comprising:
   determining a field motion measure for the interpolated pixel;
   adapting a field coring threshold and a field highest gain of a field transfer function based on the detail measure;
   using the adapted field transfer function to map the field motion measure to a field motion parameter;
   scaling the field motion parameter when the field motion measure is high and the frame motion measure is low; and
   selecting the minimum of the frame motion parameter and scaled field motion parameter as a motion parameter for the pixel.

9. The method of claim 7, wherein determining a frame motion measure further comprises:
   determining a frame difference measure for the interpolated pixel;
   determining a slow motion frame difference measure for the interpolated pixel; and
   mixing the frame difference measure and the slow motion frame difference measure based on the detail measure to generate the frame motion measure.

10. The method of claim 7, wherein determining a detail measure further comprises:
    determining a spatial activity measure;
    determining a local detail measure; and
    determining an edge complexity measure and an edge strength measure;
    wherein the detail measure is determined based on the spatial activity measure, the local detail measure, the edge complexity measure, and the edge strength measure.

11. The method of claim 7, wherein adapting a frame coring threshold and a frame highest gain further comprises:
    increasing the frame coring threshold and reducing the frame highest gain based on the amount of detail indicated by the detail measure.

* * * * *